US007694880B2

(12) United States Patent
Mori et al.

(10) Patent No.: US 7,694,880 B2
(45) Date of Patent: Apr. 13, 2010

(54) ANONYMOUS ELECTRONIC VOTING SYSTEM AND ANONYMOUS ELECTRONIC VOTING METHOD

(75) Inventors: Kengo Mori, Tokyo (JP); Kazue Sako, Tokyo (JP)

(73) Assignee: NEC Corporation, Tokyo (JP)

( * ) Notice: Subject to any disclaimer, the term of this patent is extended or adjusted under 35 U.S.C. 154(b) by 811 days.

(21) Appl. No.: 10/587,665

(22) PCT Filed: Jan. 18, 2005

(86) PCT No.: PCT/JP2005/000532

§ 371 (c)(1),
(2), (4) Date: Jul. 26, 2006

(87) PCT Pub. No.: WO2005/071878

PCT Pub. Date: Aug. 4, 2005

(65) Prior Publication Data

US 2007/0185761 A1 Aug. 9, 2007

(30) Foreign Application Priority Data

Jan. 26, 2004 (JP) ............................ 2004-016894

(51) Int. Cl.
*G06F 17/60* (2006.01)

(52) U.S. Cl. ...................................... 235/386; 235/382

(58) Field of Classification Search ................. 235/386, 235/385, 380, 382
See application file for complete search history.

(56) References Cited

U.S. PATENT DOCUMENTS 6,892,944 B2 * 5/2005 Chung et al. ................ 235/386
7,237,717 B1 * 7/2007 Rao et al. ................... 235/386
7,306,148 B1 * 12/2007 Morganstein ............... 235/386
7,395,964 B2 * 7/2008 Anderson et al. ........... 235/386

FOREIGN PATENT DOCUMENTS

JP 2-151892 A 6/1990
JP 2001-243395 9/2001

(Continued)

OTHER PUBLICATIONS

Kengo Mori, et al., "An Implementation of an Electronic Voting System Using Shuffling," Heisei 14 Nen Denki Gakkai Denshi Joho System Bumon Taikai Koen Ronbunshu, Sep. 2002, vol. 2002, pp. 421-424.

(Continued)

*Primary Examiner*—Daniel St. Cyr
(74) *Attorney, Agent, or Firm*—Dickstein Shapiro LLP

(57) ABSTRACT

A voting server transmits a list of plaintext and encrypted voting data obtained by encrypting the plaintext to a voter terminal, and the voter terminal a selected encrypted candidate name corresponding to the plaintext elected by the voter to an encryption server. The encryption server returns encrypted voting data obtained by re-encrypting the encrypted candidate name to the voter terminal, and the voter terminal transmits the encrypted voting data received from the encryption server for voting. Decryption of the encrypted voting data is performed by an anonymous decryption system. The voter terminal certifies the voter to an authentication server, and affixes a digital signature to the encrypted voting data based on a common-key authentication base, transmitting the same to the voting server.

22 Claims, 28 Drawing Sheets

FOREIGN PATENT DOCUMENTS

| | | | |
|---|---|---|---|
| JP | 2001-251289 | A | 9/2001 |
| JP | 2002-237810 | A | 8/2002 |
| JP | 2002-344445 | A | 11/2002 |
| WO | WO-00/62257 | | 10/2000 |

OTHER PUBLICATIONS

Sako Kazue et al., "Realization of Large-scale Electronic Voting Sytem Using Shuffling," on second meeting of Information Processs-ing Society of Japan, Mar. 2001.

* cited by examiner

ANONYMOUS ELECTRONIC VOTING SYSTEM AND ANONYMOUS ELECTRONIC VOTING METHOD

TECHNICAL FIELD

The present invention relates to anonymous electronic voting system and method and, more particularly, to an anonymous electronic voting system and an anonymous electronic voting method, which is capable of being used from various client environment.

BACKGROUND TECHNOLOGY

An anonymous electronic voting system is a system that electronically realizes uninscribed secret vote effected through a network, fore example. Examples of the conventional anonymous electronic voting system are described in Patent Publication 1 and a non-Patent Publication 1. In the following description, the "vote" includes a vote for electing a candidate from among candidates set beforehand, as well as a questionnaire etc. which allows a free description. In addition, the "candidate" and "candidate name" are directed not only to a candidate and a candidate name in an election, but also to an element (item) or an element name (item name) in a case wherein the element or element name are selected by the intention of the voter from an assembly.

As shown in FIG. 28, a conventional anonymous electronic voting system includes an anonymous decryption system 900 configured by a window center 901 and a plurality of decrypting shuffle centers 902, and a vote management center (voting server) 910 to which each voter will access. The anonymous decryption system 900 is provided in order to keep the secrecy of vote, and is used for outputting the decrypted result while securing secrecy for the correspondence between the voter and the encrypted voting data.

The conventional anonymous electronic voting system having such a configuration operates as follows.

First, the window center 901 and the decrypting shuffle center 902 create public information of the system, such as an encryption key for voting, and transmit the same to the vote management center 910, which notifies each voter of the public information.

After the voting period starts, each voter encrypts own voting contents based on the public information, to create an encrypted voting contents, and also creates a digital signature of the voter, transmitting the encrypted voting contents and the digital signature to the vote management center 910. At this stage, each voter creates the encrypted voting contents and the digital signature in the own client terminal, and transmits the encrypted voting contents and the digital signature to the vote management center 910 from the own client terminal through a variety of networks. The vote management center 910 verifies the received digital signature, examines the voting right of the voter based on the list of electorate names, and accepts the received, encrypted voting contents after confirming that there is no duplication of the vote.

After the voting period expires, the vote management center 910 finishes registration of the votes, and transmits the list of the encrypted voting contents received between the start and the end of the voting period to the window center 901 of the anonymous decryption system 900. The window center 901 decrypts the list of the encrypted voting contents through the decrypting shuffle center 902, permutes the voting contents in the list to obtain the list of plaintext voting contents, and returns the list of the plaintext voting contents to the vote management center 910.

The vote management center 910 tallies (sums up) the voted results based on the list of the plaintext voting contents received from the window center 901.

Patent Publication 1: JP-2002-237810A

Patent Publication 2: JP-2001-251289A

Patent Publication 3: JP-2002-344445A

Non-Patent Publication 1: "Realization of Large-scale Electronic Voting System using Shuffling" on second meeting of Information Processing Society of Japan, March, 2001, by SAKO, Kazue etc. including other six members.

DISCLOSURE OF THE INVENTION

Problem to be Solved by the Invention

In the conventional anonymous electronic voting system, if the client terminal used by a voter is a device having a small storage capacity and a lower processing throughput, such as a cellular phone, a problem arises in that a vote securing the secrecy is difficult to achieve. This is because the encryption processing program used by the voter in the conventional anonymous electronic voting system is difficult to load on the device having a small storage capacity and a lower processing throughput, and on the other hand, if the voting contents are transmitted to and encrypted by another device, the voting contents are known to the another device executing the encryption processing.

In addition, there is another problem in the conventional anonymous electronic voting system in that it is difficult to verify the electorates and thus to prevent a vote by an unqualified electorate and/or duplicated votes in a vote (such as public office election) having a large number of public electorates. This is because, although the conventional electronic voting system premises that all the voters are registered on the common public-key-certificate base for the digital signature used for voters authentication, such a base has not been widely used heretofore.

In view of the above, it is a first object of the present invention to provide an electronic voting system and an anonymous electronic voting method which are capable of performing the votes while securing the secrecy of a vote delivered even from a device having a small storage capacity and a lower processing throughput, such as a cellular phone.

It is a second object of the present invention to provide an anonymous electronic voting system and an anonymous electronic voting method which are capable of performing an electorate certificate even if the condition where all the electorates are registered on the common-public-key authentication base is not yet established.

The present invention provides, in a first aspect thereof, an anonymous electronic voting system including:

a voter terminal for receiving a list of combinations of candidate name and encrypted candidate name, to transmit said encrypted candidate name of a selected candidate via a network;

at least one encryption server for receiving and re-encrypting the encrypted candidate name to create encrypted voting data, and returning the encrypted voting data to the voter terminal having transmitted the encrypted candidate name;

a voting server for receiving the encrypted voting data from the voter terminal to create a list of effective encrypted voting data from among received encrypted voting data, and transmitting the created list of the effective encrypted voting data via the network; and a decryption server for decrypting the list of the effective encrypted voting data received from the voting server, to create a list of plaintext candidate names rearranged from the list of the effective encrypted voting data, wherein the voting server receives the plaintext candidate names from the decryption server, to tally vote results based on the received plaintext candidate names.

In a preferred embodiment of the anonymous electronic voting system of the first aspect of the present invention, the voting server is connected to the decryption server (anonymous decryption system), and is provided with an encryption means, wherein a voter terminal having therein no encryption means is connected to an authentication server. The encryption server includes a re-encryption means, whereas the authentication server includes ID coalition means and a common-base-signature creation means.

In the above configuration, the voting server transmits a combination of plaintext candidate name and encrypted candidate name to a voter terminal having no encryption means. The voter terminal having no encryption means transmits the encrypted candidate name corresponding to the candidate name elected by the voter via an encryption server after re-encrypting the encrypted candidate name. The voting server decrypts the received encrypted data by using an anonymous decryption system, to achieve the first object of the present invention.

In addition, a voter terminal having no common-base-signature creation means performs intra-organization personal certification, the authentication server converts the voter ID in a closed organization into a common-base ID by using a ID coalition means, and transmits the combination of ID and voted contents by affixing thereto a common-base digital signature to the voter terminal. Thus, the authentication server certifies based on the digital signature of the authentication server that the personal certificate is performed using an existing authentication base, whereby the second object of the present invention can be achieved.

The present invention provides, in a second aspect thereof, an anonymous electronic voting system including:

voter terminals connected to a network;

a first encryption server including a first data conversion means (206) for creating a first encryption parameter for each of the voter terminals from public information, and transmitting the first parameter to the voter terminals;

a second encryption server including a second data conversion means for creating a second encryption parameter, and transmitting the second parameter to the voter terminals;

a voting server for receiving encrypted voting data from the voter terminals to create a list of effective encrypted voting data from among received encrypted voting data, and transmitting the created list of the effective encrypted voting data via the network; and a decryption server for decrypting the list of the effective encrypted voting data received from the voting server, to create a list of plaintext candidate names rearranged from the list of the effective encrypted voting data, wherein:

the voting server receives the plaintext candidate names from the decryption server, to tally voted results based on the received plaintext candidate names; and the voter terminals each include an encryption means for encrypting voting contents based on the first and second encryption parameters to create encrypted voting data, and transmits the encrypted voting data to the voting server.

In a preferred embodiment of the anonymous electronic voting system of the second aspect of the present invention, the voting server includes the first conversion means instead of the encryption means in the anonymous electronic voting system of the first aspect, and includes the second conversion means instead of the re-encryption means of the encryption server in the anonymous electronic voting system of the first aspect, and the voter terminal includes an encryption means (encrypted-data creation means).

In the anonymous electronic voting system according to the preferred embodiment of the second aspect, the voting server performs a part of calculation necessary for encryption processing of the voting contents by using the first conversion means, to transmit the resultant encrypting parameter to the voter terminal, and the encryption server similarly performs a part of calculation necessary for encryption processing of the voting contents by using the second conversion means, to transmit the resultant encrypting parameter to the voter terminal. The voter terminal inputs, in addition to the voting contents, the first conversion result received from the voting server and the second conversion result received from the encryption server in the encrypted-data creation means to create encrypted voting data, whereby the first object of the present invention can be achieved.

The anonymous electronic voting system of the present invention achieves an advantage that the electronic voting can be performed even from a device having a small storage capacity and a lower processing throughput. This is because all the encryption processing or the conversion processing having a large computing amount in the encryption processing need not be executed by the voter terminals.

In addition, the anonymous electronic voting system of the present invention achieves an advantage that the secrecy of the vote can be secured even if the vote is performed by a device having a small storage capacity and a lower processing throughput. This is because the decryption of the encrypted voting data is performed by the decryption server, and thus the correspondence between the encrypted voting data and the plaintext cannot be known even after all the encrypted voting data are decrypted and because the plaintext voting contents are encrypted by both the voting server and the encryption server and thus each of the voting server and the encryption server alone cannot decrypt the encrypted voting data.

In an anonymous electronic voting system of a preferred embodiment of the present invention, the voting can be effected while preventing an unjustified vote even if the condition wherein all the electorates are registered in the common-public-key authentication base is not established. This is because an electorate having a limited certification means in a specific organization can be verified by the authentication server, and the voting data thereof is affixed with the digital signature of the authentication server, whereby the data can be verified as such by the voter verified by the authentication server.

BEST MODES FOR CARRYING OUT THE INVENTION

Next, preferred embodiments of the present invention will be described in detail with reference to the drawings.

First Embodiment

Figure 1:
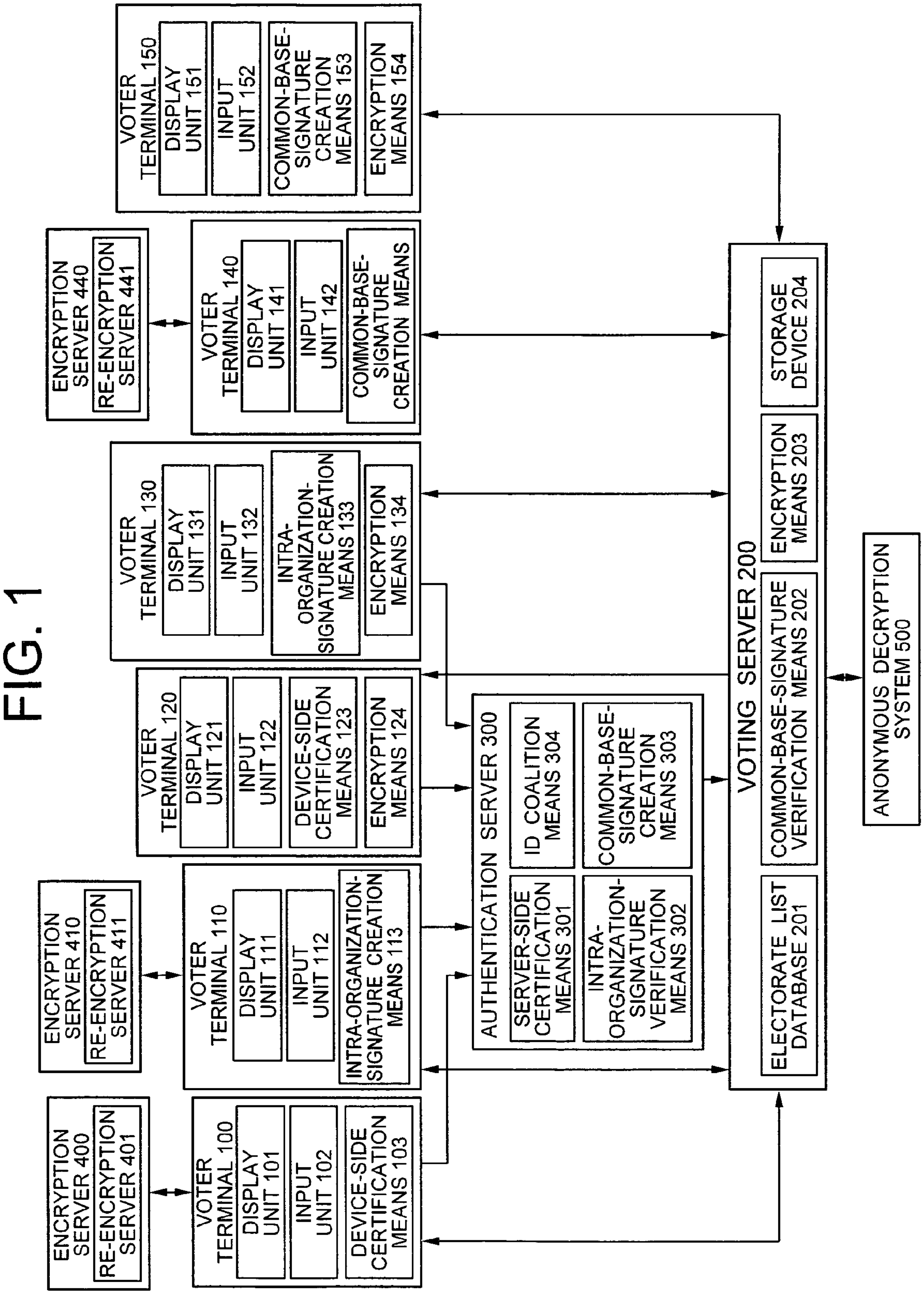
FIG. 1 is a block diagram showing the configuration of an anonymous electronic voting system according to a first embodiment.

FIG. 1 shows the configuration of an anonymous electronic voting system according to a first embodiment of the present invention. This anonymous electronic voting system includes voter terminals 100, 110, 120, 130, 140, 150 having different components and processing throughputs, a voting center (voting server) 200, an authentication server 300, encryption servers 400, 410, 440, and an anonymous decryption system 500. The encryption servers 400, 410, 440 are connected to the voter terminals 100, 110, 140, respectively. A variety of modes exist in the connection from the voter terminals 100, 110, 120, 130, 140, 150 to the voting center 200, and include a direct connection of some to the voting center 200, and a connection of others to the voting center 200 via the authentication server 300, and a parallel connection including the direct connection and the connection via the authentication server 300. Here, two or more of each voter terminal 100, 110, 120, 130, 140, or 150 may exist, although not illustrated for a simplification purpose. In addition, a single voter terminal may be connected to a single encryption server, or a plurality of voter terminals may be connected to a single encryption server. Moreover, the encryption server and the authentication server may operate on a common server.

First, the configuration of each voter terminal 100, 110, 120, 130, 140, 150 will be described.

The voter terminal 100 includes a display unit 101, such as a display, an input unit 102, such as buttons and a keyboard, and a device-side certification means 103, and is connected to the voting server 200, authentication server 300, and encryption server 400 via a communication line etc.

The voter terminal 110 includes a display unit 111, such as a display, an input unit 112, such as buttons and a keyboard, and an intra-organization-base-signature creation means 113, and is connected to the voting server 200, authentication server 300, and encryption server 410 via the communication line etc.

The voter terminal 120 includes a display unit 121, such as a display, an input unit 122, such as buttons and a keyboard, a device-side certification means 123, and an encryption means 124, and is connected to the voting server 200 and authentication server 300 via the communication line etc.

The voter terminal 130 includes a display unit 131, such as a display, an input unit 132, such as buttons and a keyboard, an intra-organization-base-signature creation means 133, and an encryption means 134, and is connected to the voting server 200 and authentication server 300 via the communication line etc.

The voter terminal 140 includes a display unit 141, such as a display, an input unit 142, such as buttons and a keyboard, and a common-base-signature creation means 143, and is connected to the voting server 200 and encryption server 440 via the communication line etc.

The voter terminal 150 includes a display unit 151, such as a display, an input unit 152, such as buttons and a keyboard, a common-base-signature creation means 153, and an encryption means 154, and is connected to the voting server 200 via the communication line etc.

The voting server 200 includes an electorate-list data base 201, a common-base signature verification means 202, an encryption means 203, and a storage device 204, such as a hard disk drive, and is connected to the voter terminals 100, 110, 120, 130, 140, 150 and authentication server 300 via the communication line etc.

The authentication server 300 includes a server-side certification means 301, an intra-organization-base-signature verification means 302, a common-base-signature creation means 303, and an ID coalition means 304.

The encryption servers 400, 410, 440 include re-encryption means 401, 411, 441, respectively.

The device-side certification means 103, 123 of the voter terminal 100, 120 communicate with the server-side certification means 301 of the authentication server 300 so that the identifier of the voter operating the voter terminal is verified to be IDj, and communicate with the server-side certification means 301 of the authentication server 300 to notify the authentication server 300 of the identifier IDj of the voter j operating the voter terminal 100, 120.

The encryption means 124, 134, 144, 154, 203, provided in the voter terminals 120, 130, 140, 150 and the voting server 200, receive an encryption public key Y and a plaintext voting data v, and output encrypted voting data E(v) obtained by encrypting v based on Y.

The re-encryption means 401, 411, 441 of the encryption servers 400, 410, 440 receive the encryption public key Y and encrypted voting data E(v), and output re-encrypted voting data E' (v) obtained by encrypting E(v) based on Y.

The intra-organization signature creation means 113, 133 of the voter terminals 110, 130 receive the encrypted voting data E(vj), intra-organization identifier IIDj of the voter j and a signature private key (secret key) dj, and output a digital signature Sej for the data (E(vj), IIDj) directed to the organization of the voter j.

The intra-organization-signature verification means 302 of the authentication server 300 receives encrypted voting data E(vj), intra-organization identifier IIDj, intra-organization digital signature Sej and verification public key Pj, and judges whether or not Sej is correctly calculated for the data (E(vj), IIDj) based on the signature public key dj.

The common-base-signature creation means 143, 153 of the voter terminals 140, 150 receive the encrypted voting data E(vj), common identifier CIDj of the voter j and signature private key dj, and output the common-base digital signature Sej of the voter j for the data (E(vj), CIDj).

The common-base-signature creation means 303 of the authentication server 300 receives the encrypted voting data E(vj), common identifier CIDj of the voter j, and signature public key dk for the authentication server, and outputs the common-base digital signature Sek of the voter j for the data (E(vj), CIDj).

The common-base-signature verification means 202 of the voting center 200 receives the encrypted voting data E(vj), common identifier CIdj, and common-base digital signature Sek, and judges whether or not Sek is correctly calculated based on the signature private key dk for the data (E(vj), CIDj).

The correspondence between the intra-organic identifier IIDj and the common identifier CIDj is registered in the ID coalition means 304 of the authentication server 300, and if an intra-organic identifier IIDj is input thereto, a corresponding common identifier CIDj is output therefrom.

The anonymous decryption system 500 creates and outputs an encryption public key Y in accordance with the default information input from the outside. If the list of encrypted voting data E(vj) is input from the outside, the anonymous decryption means 500 decrypts the list of E(vj) and outputs the list of the plaintext voting data vj rearranged at random, and the data certifying presence of the one-to-one correspondence between the list of the input E(j) and the output vj.

The intra-organization-signature creation means 113, 133 of the voter terminals 110, 130, the common-base-signature creation means 143, 153 of the voter terminals 140, 150, and the common-base-signature creation means 303 of the authentication server 300 each are provided for creating a digital signature. On the other hand, the intra-organization-signature verification means 302 of the authentication server 300 and the common-base-signature verification means 202 of the voting server 200 are provided for verifying the digital signature. A digital signature using a common public key, such as RSA encryption, may be used as this digital signature. If the RSA encryption is used here, the signature Sjv of the signer j for the data V is calculated by using the V and signature private key dj of the signer j by the following relationship:

$$Sjv=V\hat{}dj \bmod n,$$

and the signature verification is successfully performed if the following relationship holds:

$$Sjv\hat{}ej=V \bmod n,$$

by using the V, Sjv, and verification public key ej. It is to be noted that "^" means the symbol of raise-power, and thus V^dj means the result of raising V to the dj-th power (i.e., $V^{dj}$).

Here, dj, ej, and n are integers expressed by:

$$n=p\times q; \text{ and}$$

$$dj\times ej=1 \bmod (p-1)\times(q-1),$$

for two prime factors p and q. A pair (dj, ej) which is unique for each signer is created for each signer j, and dj is held in secrecy by the each signer j whereas a pair (n, ej) is open to public in relation to the identifier IDj of the signer j. For verification of the signature, a verification processing is conducted by retrieving the correspondence between the open IDj and (n, ej) to obtain the (n, ej). The dj is referred to as signature-creation private key whereas the (n, ej) is referred to as signature-verification public key.

The identifier IDj in the intra-organization-signature creation means 113, 133 and intra-organization-signature verification means 302 is an intra-organization identifier, such as an employee code, open to and used in only the internal of a specific organization. Thus, it is possible that the identifiers allocated to different persons belonging to different organizations are the same IDj, whereas the correspondence between such an identifier and the identifier of the electorate (such as electorate name) registered in an electorate list is not necessarily open to the public. The combination of the signature-verification public key (n, ej) corresponding to the IDj may be open to only the internal of the organization as well.

On the other hand, the identifier IDj of the signer as well as (n, ej) in the common-base-signature creation means 143, 153, 303 and common-base-signature verification means 202 is widely open to the public, and thus is a common identifier which is not allocated to different persons. Information including the common identifier is registered in the electorate list database 201.

The device-side certification means 103, 123 of the voter terminals 100, 120 and the server-side certification means 301 of the authentication server 300 are provided to perform personal certification. Here, the personal certification based on an ID-character train and a password, as well as the personal certification based on an terminal certificate in a cellular phone system can be used.

For performing personal certification based on the ID-character train and the password, the correspondence between the intra-organization identifier of the voter and the password is registered beforehand in the authentication server 300. The device-side certification means 103, 123 transmits the intra-organization identifier IIDj of the voter, input via the input unit 102, 122, to the authentication server 300. The server-side certification means 301 confirms that the received IIDj is included in the list of intra-organization identifiers which are registered beforehand, creates random number c, and returns the same to the voter terminal 100, 120. The device-side certification means 103, 123 inputs the password pw input via the input unit 102, 122 and the random number c into a hash function, such as SHA1, and returns the resultant output value r to the authentication server 300. The server-side certification means 301 retrieves the pw corresponding to the IIDj from the list of the intra-organization identifiers and passwords by using the IIDj as a key. The server-side certification means 301 inputs the pw and c into the hash function, such as SHA1, and recognizes the voter operating the voter terminal 100 120 as the voter identified by the IIDj, if the resultant output value coincides with the value r returned from the voter terminal 100, 120.

In the present embodiment, the techniques described in the Patent Publication 1, for example, can be used for the encryption means 123, 133, 153, 203 provided in the voter terminal 120, 130, 150 and the voting server 200, the re-encryption means 401, 411, 441 provided in the encryption server 400, 410, 440, and the anonymous decryption system 50.

If the techniques described in the Patent Publication 1 are used, upon input of the security parameters (pL, qL, t) and session ID from the voting center 200, the anonymous decryption means 500 will create the public information (p, q, g) and a private key X based on the (pL, qL, t), output the public information (p, q, g, Y) after adding the public key Y to the public information, and return the same to the voting center 200. Here, p and q are the parameters of ElGamal encryption, and are prime factors defined by the following relationship:

$$p=k\times q+1,$$

where k is an integer. The g is a source which creates the subgroup of orders q in modulo p. The pL and qL are the length of the prime factors p and q, and the t is the number of repetition times to be used for creation and verification of the data in order for certifying that a correct processing is performed for the change of the sequential order. The session ID is an identifier for distinguishing the object for the processing. Examples of the object for processing include election of a prefectural governor and city council members. The public key Y is obtained for the decryption key X by calculating:

$$Y=g\hat{}X \bmod q,$$

where the decryption key X is a random number which is selected at random from the numbers below q.

The encryption means 123, 133, 153, 203 receives the public information (p, q, g, Y) and plaintext voting data vi, and outputs encrypted voting data E(vi). The E(vi) is expressed by the pair (Gi, Vi) by calculating:

$$(Gi, Vi)=(g\hat{}r \bmod p, vi\times Y\hat{}r \bmod p),$$

where r is a random number selected at random for the plaintext voting data vi.

In addition, it is possible in the present embodiment to create a certificate that the encrypted voting data is created after legitimately knowing the r. For example, after generating a random number si in the encryption of vi, the random number verification data .i and ti are created by using;

$$.i=g\hat{}si \bmod p;$$

$$ci=\mathrm{HASH}(p,q,g,Y,Gi,Vi,.i);\ \text{and}$$

$$ti=ci\times ri+si \bmod p.$$

This certificate can be verified by calculating:

$$ci=\mathrm{HASH}(p,q,g,Gi,.i),\ \text{and}$$

by examining whether or not the following relationship holds:

$$g\hat{}ti\times Gi\hat{}\{-ci\}=.i \bmod p.$$

Here, HASH (p, q, g, Y, Gi, Vi, .i) is a value obtained by inputting p, q, g, Y, Gi, Vi, and .i into the hash function, such as SHA1.

The re-encryption means 401, 411, 441 receives the public information (p, q, g, Y) and encrypted voting data E(vi)=(Gi, Vi), and outputs encrypted voting data E'(vi). E'(vi) is expressed by the group (G'i, V'i), and is obtained by calculating:

$$(G'i, V'i)=(Gi\times g\hat{}s \bmod p, Vi\times Y\hat{}s \bmod p).$$

Here, s is a random number selected at random for the encrypted voting data E(vi). It is to be noted that the following equation holds:

$$\begin{aligned}(G'i, V'i) &= (Gi\times g\hat{}s \bmod p,\ Vi\times Y\hat{}s \bmod p)\\ &= (g\hat{}\{r+s\} \bmod p,\ vi\times Y\hat{}(r+s) \bmod p),\end{aligned}$$

and the plaintext voting data vi can be obtained by processing E'(vi) similarly to the decryption processing conducted to E(vi). That is, E(vi) and E'(vi) can be similarly treated for the decryption processing thereof.

After the voting center 200 inputs the list of Ei=(Gi, Vi) and session ID into the anonymous decryption system 500, the anonymous decryption system 500 decrypts the list of (Gi, Vi) based on the public information (p, q, g, Y) and decryption key X specified by the session ID, and returns the list of plaintext voting data vi, which are rearranged in the order at random, and the certification data, which certifies presence of the one-to-one correspondence between the list of (Gi, Vi) and the list of vi, to the voting center 200.

The techniques described in Patent Publication 1 are used as the methods for creating p, q, g and X, decrypting the list of (GI, Vi), rearranging the order thereof, certifying the presence of the one-to-one correspondence between the list of (Gi, Vi) and the list of vi and verifying the same.

In this context, inputs and outputs of the constituent elements are described mainly in the case of using the techniques described in Patent Publication 1. It is to be noted that techniques for certifying the presence of the one-to-one correspondence between the list of encrypted data and the data list output after the decryption thereof, without any leak-out of the information of the concrete correspondence itself are described in JP-2001-251289A (Patent Publication 2), JP-2002-344445A (Patent Publication 3) etc., and that the encryption means 123, 133, 153, re-encryption means 401, 411, 441, and anonymous decryption system 500 may be realized by using those techniques.

Next, overall operation of the anonymous electronic voting system of the present embodiment will be described.

Figure 2:
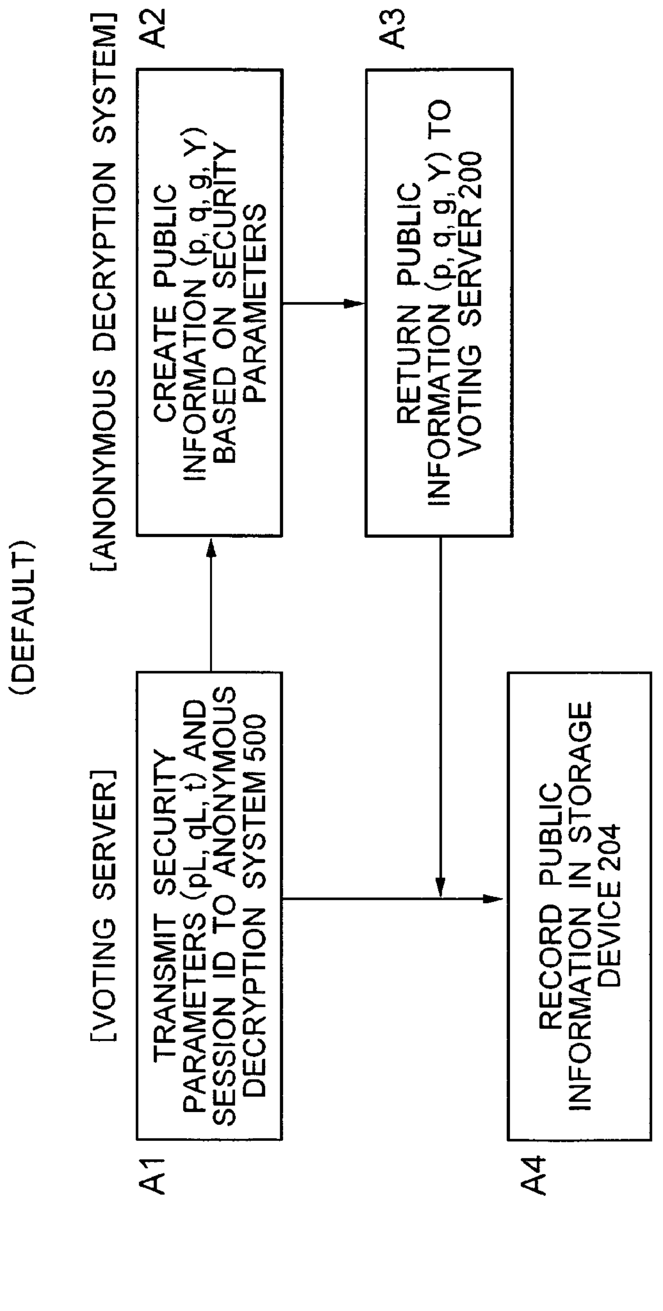
FIG. 2 is a flowchart showing operation in a default of the first embodiment.

FIG. 2 shows operation for the default of the anonymous electronic voting system of the present embodiment. First, the voting server 200 transmits security parameters (pL, qL, t) and session ID to the anonymous decryption system 500 (step A1). The anonymous decryption system 500 creates public information (p, q, g, Y) based on (pL, qL, t) (step A2), and returns the same to the voting server 200 (step A3). The voting server 200 registers (p, q, g, Y) in the storage device 204 (step A4). Thus, the default is finished.

Next, operation of the vote using the voter terminals 100, 110, 120, 130, 140, 150 will be described with reference to FIGS. 3 to 9. FIGS. 3 to 8 show processings by the voter terminals 100, 110, 120, 130, 140, 150 (as well as processings by the voting server, authentication server, and encryption server, relevant to the processings by the voter terminals). FIG. 9 describes processings corresponding to operation from the start of reception of votes to the tally of votes.

After the voting period stars, a voter, i.e., electorate, accesses to the voting server 200 via one of the voter terminals 100, 110, 120, 130, 140, 150. At this stage, in a vote from the voter terminal 100, 110, 140, an encrypted-voting-information request is transmitted (step A5-1 in FIGS. 3, 4, 7), whereas in a vote from the voter terminal 120, 130, 150, a mere voting-information request is transmitted (step A5-2 in FIGS. 5, 6, 8). The voting server 200, upon receiving the encrypted-voting-information request from the voter terminal 100, 110, 140, encrypts all the candidate names vj based on the public information (p, q, g, Y) to create the list of (vj, E(vj)) (step A6 in FIGS. 3, 4, 7), and returns the public information (p, q, g, Y) and list of (vj, E(vj)) to the voter terminal 100, 110, 140 (step A7-1 in FIGS. 3, 4, 7). On the other hand, if the voting server receives a mere voting-information request from the voter terminal 120, 130 or 150, the voter terminal 200 returns the public information (p, q, g, Y) and list of plaintext candidate names vj to the voter terminal 120, 130, 150 (step A7-2 in FIGS. 5, 6, 8).

Hereinafter, processings up to transmission of the voting data are separately described for each of the voter terminals 100, 110, 120, 130, 140, 150.

Figure 3:
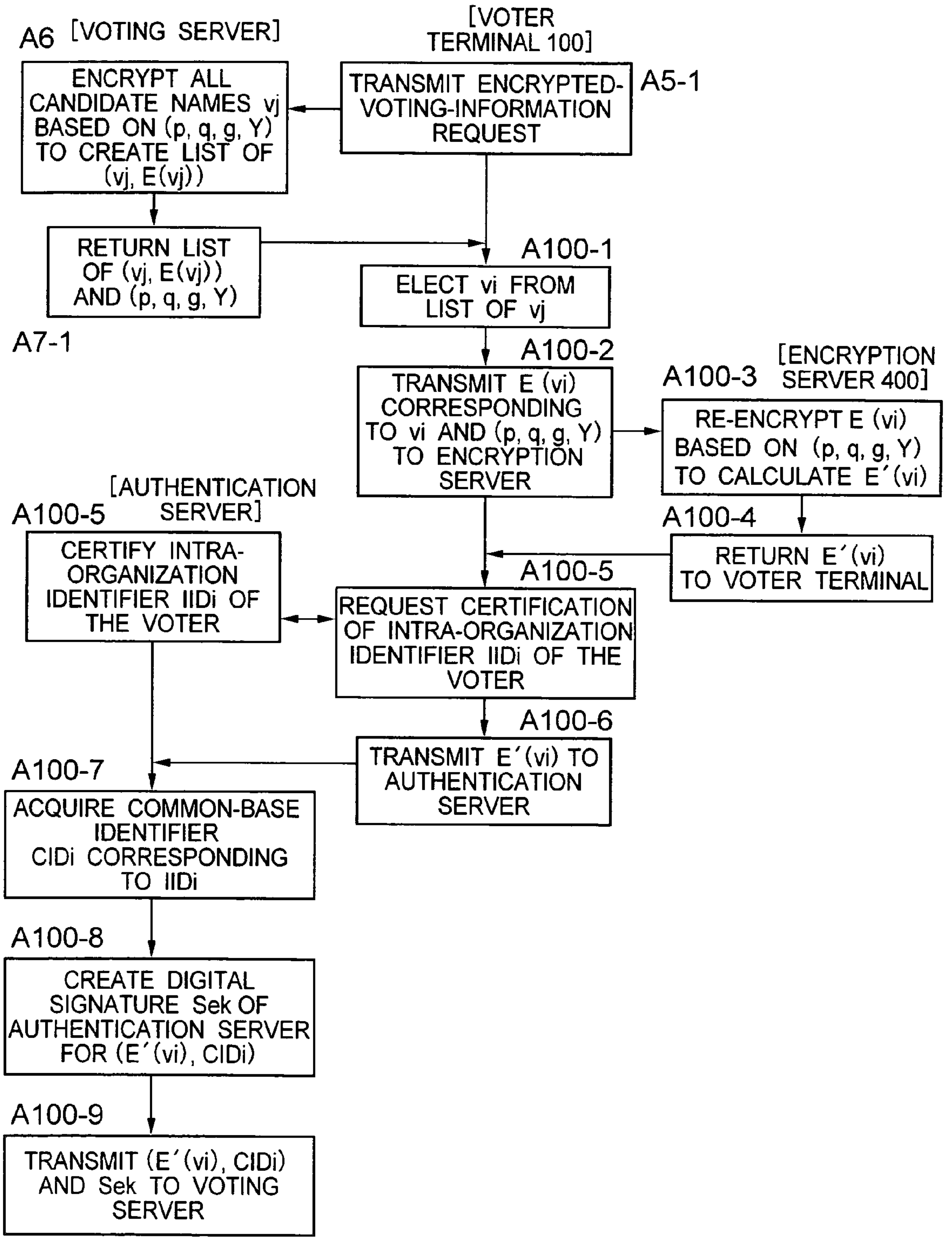
FIG. 3 is a flowchart showing operation of the voter terminal 100 in the first embodiment.

The voter terminal 100, upon receiving (p, q, g, Y) and the list of (vj, E(vj)), as shown in FIG. 3, displays the list of vj on the display unit 101, and the voter elects and inputs a candidate name vi from the list of vj via the input unit 102 (step A100-1). Thus, the voter terminal 100 transmits E(vi) corresponding to vi and the public information (p, q, g, Y) to the encryption server 400 (step A100-2). Next, the encryption server 400 inputs the received E(vi) and public information (p, q, g, Y) to the re-encryption means 401 to calculate E'(vi) by re-encrypting E(i) (step A100-3), and returns E'(i) to the voter terminal 100 (step A100-4). Then, the voter terminal 100 acquires the intra-organization identifier IIDi of the voter through the input unit 102, certifies the intra-organization identifier IIDi to the authentication server 300 by using the terminal-side certification means 103 (step A100-5), and transmits E'(vi) to the authentication server 300 (step A100-6).

The authentication server 300 inputs the intra-organization identifier IIDi of the voter confirmed by the server-side certification means 301 into the ID coalition means 304, and obtains the corresponding common identifier CIDi (step A100-7). Then, in the authentication server 300, the pair (E'(vi), CIDi) and the signature private key dk for the authentication server 300 are input to the common-base-signature creation means 303, whereby the common-base signature Sek of the authentication server 300 for (E'(vi), CIDi) is created (step A100-8). The authentication server 300 transmits (Ei, CIDi)=(E'(vi), CIDi) and Sek to the voting server 200 (step A100-9).

Figure 4:
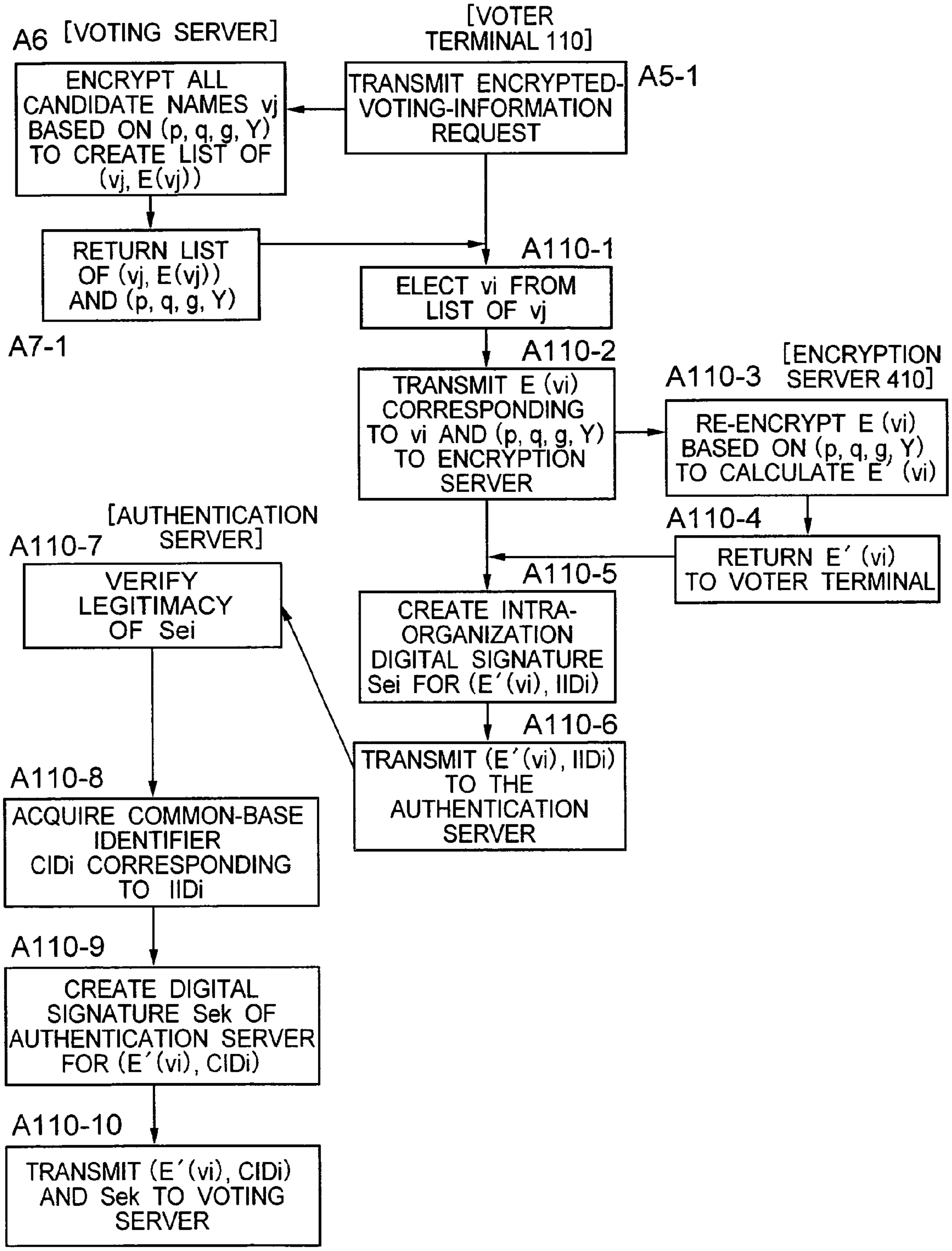
FIG. 4 is a flowchart showing operation of the voter terminal 110 in the first embodiment.
Figure 5:
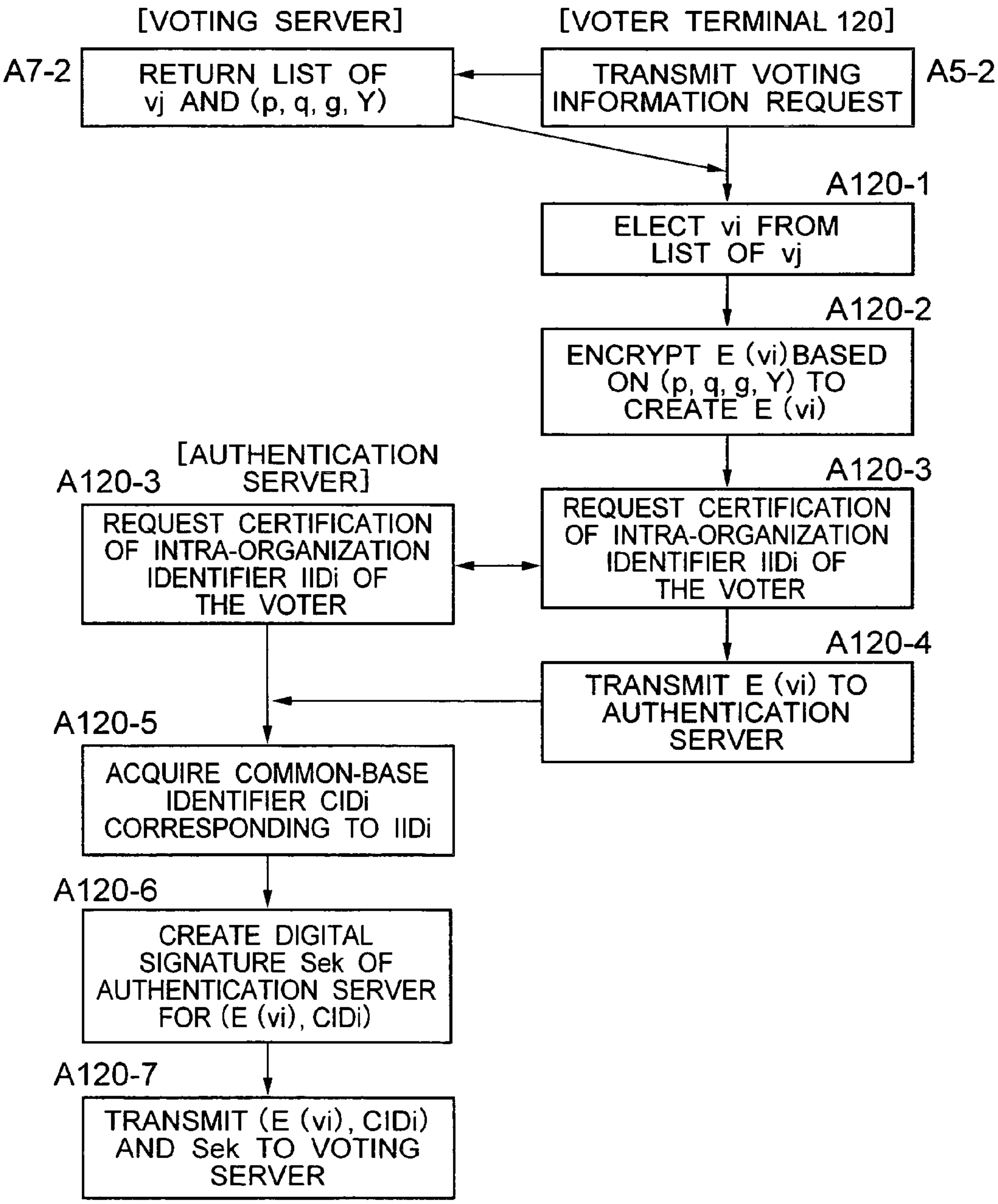
FIG. 5 is a flowchart showing operation of the voter terminal 120 in the first embodiment.

The voter terminal 110, upon receiving (p, q, g, Y) and the list of (vj, E(vj)), as shown in FIG. 4, displays the list of vj to the voter on the display unit 111, and the voter elects and inputs a candidate name vi from the list of vj via the input unit 112 (step A110-1 in FIG. 4). The voter terminal 110 transmits E(vi) corresponding to vi and the public information (p, q, g, Y) to the encryption server 410 (step A10-2 in FIG. 4). The encryption server 410 inputs the received E(vi) and public information (p, q, g, Y) into the re-encryption means 411 to calculate E'(vi) by re-encrypting E(vi) (step A110-3, and returns E'(vi) to the voter terminal 110 (step A110-4). The voter terminal 110 inputs the intra-organization identifier IIDi of the voter and signature private key di into the intra-organization-signature creation means 113, calculates the intra-organization digital signature Sei for (E'(vi), IIDi) (step A110-5), and returns (E'(vi), IIDi) and Sei to the authentication server 300 (step A110-6)

The authentication server 300 verifies whether or not Sei is legitimately calculated for (E'(vi), IIDi) based on the signature private key di in the intra-organization-signature verification means 302 (step A110-7). If successfully verified, the authentication server 300 acquires a common identifier CIDi corresponding to IIDi in the ID coalition means 304 (step A110-8). Next, the authentication server 300 inputs E'(vi), CIDi and the signature private key dk for the authentication server 300 into the common-base-signature creation means 303, to output the common-base digital signature Sek of the authentication server for (E'(vi), CIDi) (step A110-9), and transmits (Ei, CIDi)=(E'(vi), CIDi) and Sek to the voting server 200 (step A110-10).

The voter terminal 120, upon receiving (p, q, g, Y) and the list of vj, displays the list of vj to the voter on the display unit 121, and the voter elects and inputs a candidate name vi from the list of vj via the input unit 122 (step A120-1). The voter terminal 120 inputs vi and the public information (p, q, g, Y) into the encryption means 124, to create E(vi) by encrypting vi based on Y (step A120-2). Next, the voter terminal 120 certifies the intra-organization identifier IIDi of the voter to the authentication server 300 by using the device-side certification means 123 (step A120-3), and transmits E(vi) to the authentication server 300 (step A120-4).

The authentication server 300 inputs the intra-organization identifier IIDi of the voter confirmed by the sever-side certification means 301 into the ID coalition means 30, to obtain a corresponding common identifier CIDi (step A120-5). The authentication server 300 then inputs the pair (E(vi), CIDi) and signature private key dk of the authentication server 300, CIDi) into the common-base-signature creation means 303, to create the common-base-signature Sek for (E(vi), CIDi) (step A120-6), and transmits (Ei, CIDi)=(E(vi), CIDi) and Sek to the voting server 200 (step A120-7).

Figure 6:
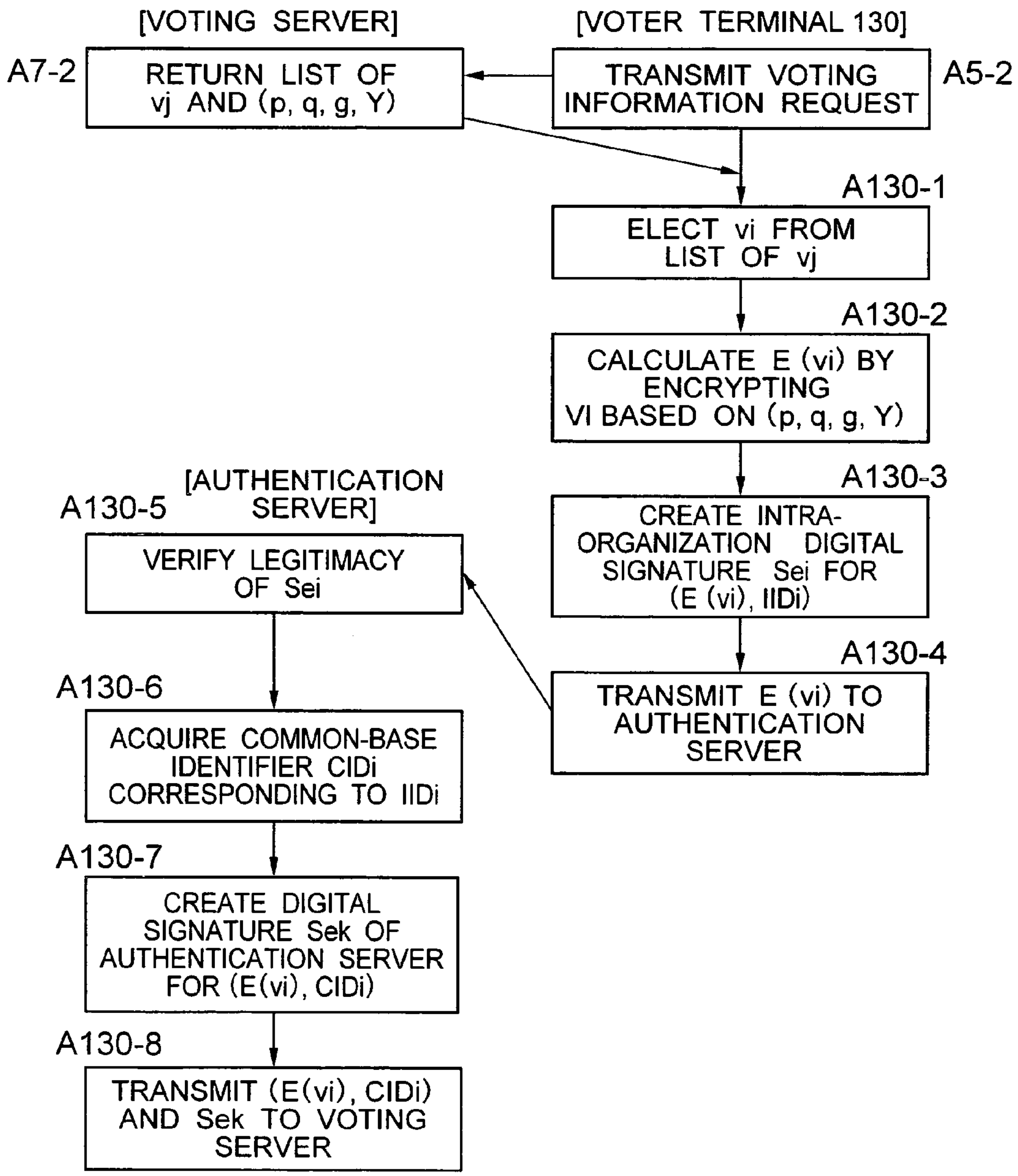
FIG. 6 is a flowchart showing operation of the voter terminal 130 in the first embodiment.

The voter terminal 130, upon receiving (p, q, g, Y) and the list of vj, as shown in FIG. 6, displays the list of vj to the voter on the display unit 131, and the voter elects a candidate name vi from the list of vj and inputs the same via the input unit 132 (step A130-1). The voter terminal 130 then inputs vi and the public information (p, q, g, Y) into the encryption means 134, to create E(vi) by encrypting vi based on Y (step A130-2). The voter terminal 130 then inputs the intra-organization identifier IIDi of the voter i, signature private keys di and E(vi) into the intra-organization-signature creation means 133 to calculate the intra-organization digital signature Sei for (E(vi), IIDi) (step A130-3), and transmits (E(vi), IIDi) and Sei to the authentication server 300 (step A130-4).

The authentication server 300 verifies whether or not Sei is legitimately calculated based on the signature private key di for (E(vi), IIDi) in the intra-organization-signature verification means 302 (step A130-5). If successfully verified, the authentication server 300 acquires a common identifier CIDi corresponding to IIDi in the ID coalition means 304 (step A130-6). The authentication server 300 inputs E(vi), CIDi and the signature private key dk of the authentication server 300 into the common-base-signature creation means 303, to output a common-base digital signature Sek of the authentication server 300 for E(vi), CIDi) (step A130-7), and transmits (Ei, CIDi)=(E(vi), CIDi) and Sek to the voting server 200 (step A130-8).

Figure 7:
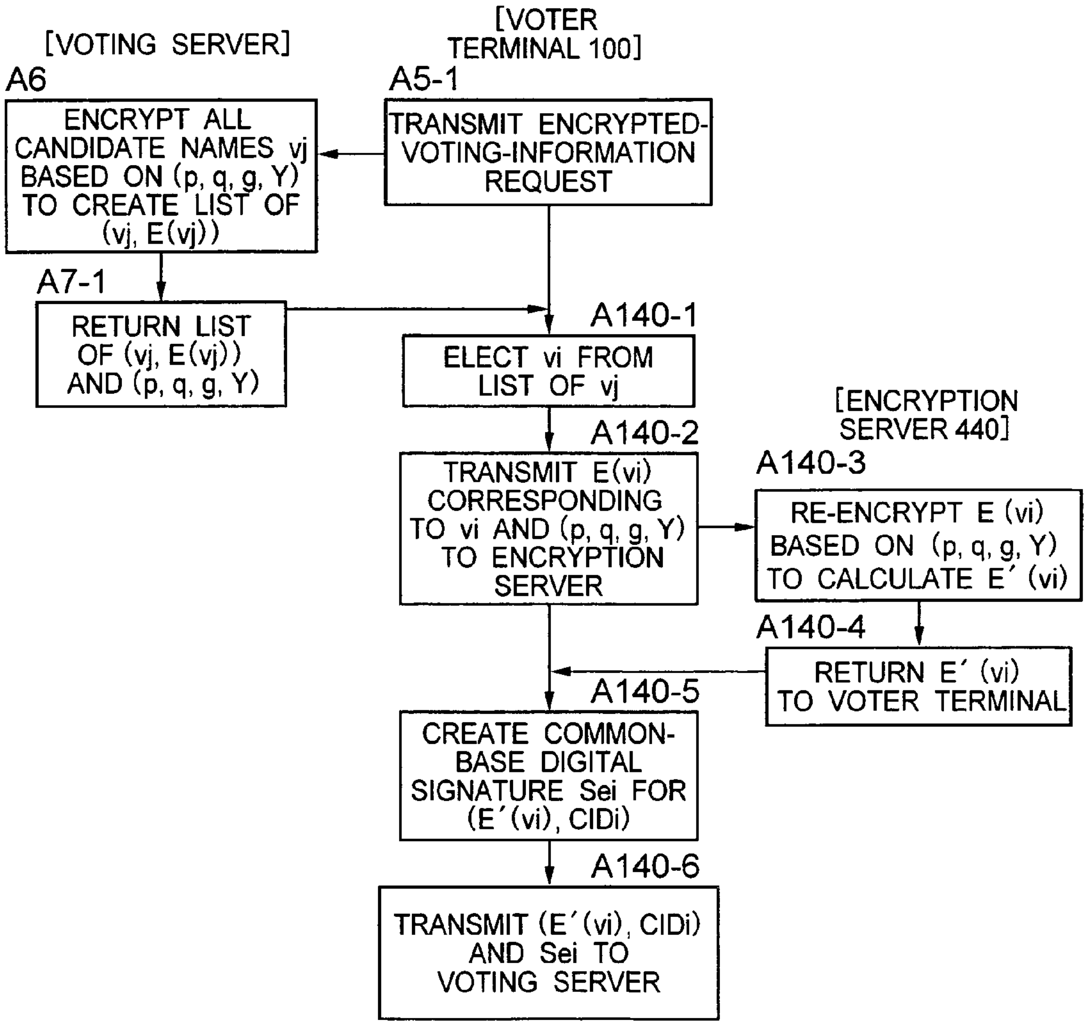
FIG. 7 is a flowchart showing operation of the voter terminal 140 in the first embodiment.

The voter terminal 140, upon receiving (p, q, g, Y) and the list of (vj, E(vj)), as shown in FIG. 7, displays the list of vj to the voter on the display unit 141, and the voter elects and inputs a candidate name vi from the list of vj via the input unit 142 (step A140-1). The voter terminal 140 then transmits E(vi) corresponding to vi and public information (p, q, g, Y) to the encryption server 440 (step A140-2). The encryption server 440 inputs the received E(vi) and the public information (p, q, g, Y) into the re-encryption means 441 to calculate E'(vi) by re-encrypting E(vi) (step A140-3), and returns E'(vi) to the voter terminal 140 (step A140-4). The voter terminal 140 then inputs the common-base identifier CIDi of the voter i, signature private key di and E'(vi) into the common-base-signature creation means 143, to calculate the common-base digital signature Sei for (E'(vi), CIDi) (step A140-5), and transmits (Ei, CIDi)=(E'(vi), CIDi) and Sei to the voting server 200 (step A140-6)

Figure 8:
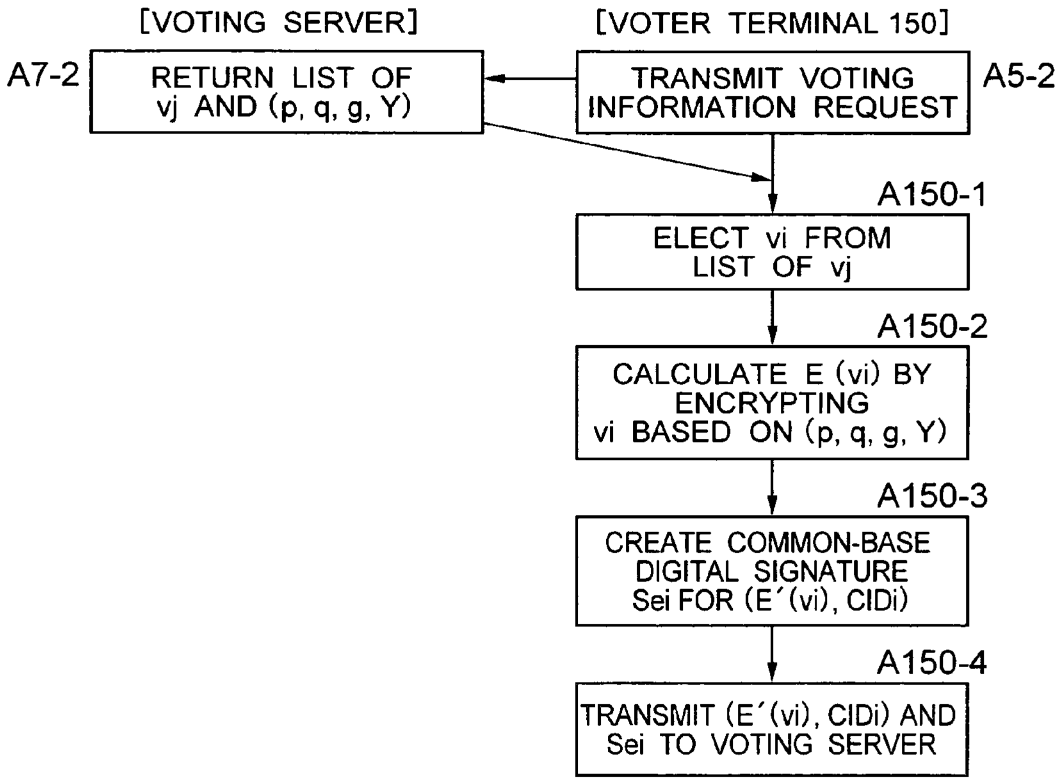
FIG. 8 is a flowchart showing operation of the voter terminal 150 in the first embodiment.
Figure 9:
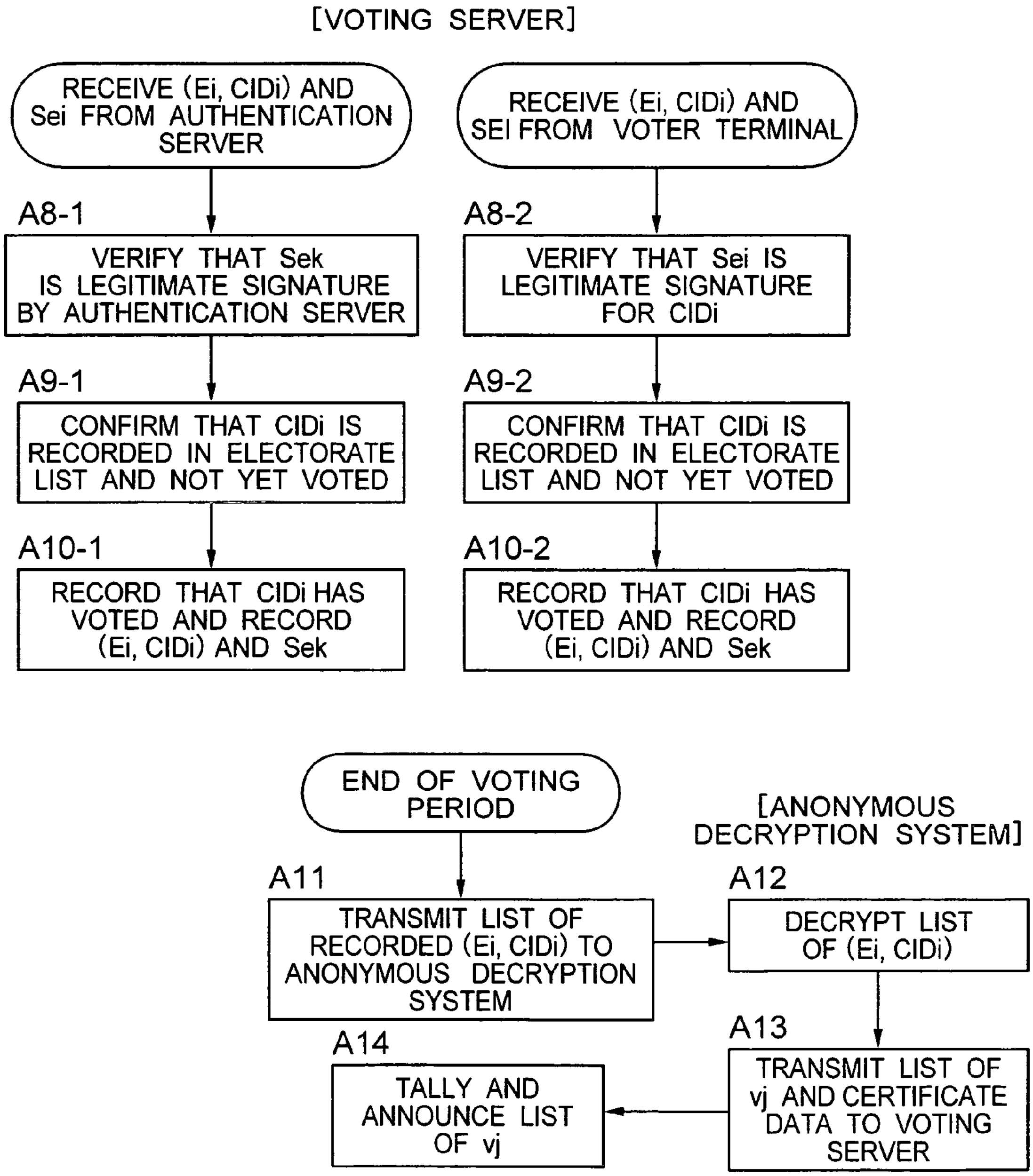
FIG. 9 is a flowchart showing operation of the voting server 200 in the first embodiment.

The voter terminal 150, upon receiving (p, q, g, Y) and the list of vj, as shown in FIG. 8, displays the list of vj to the voter on the display unit 151, and the voter elects and inputs a candidate name vi from the list of vj via the input unit 152 (step A150-1). The voter terminal 150 inputs vi and the public information (p, q, g, Y) into the encryption means 154, to creates E(vi) by encrypting vi based on Y (step A150-2). The voter terminal 150 then inputs the common-base signature CIDi of the voter, signature private key di and E(vi) into the common-base-signature creation means 153, to calculate the common-base digital signature Sei for (E(vi), CIDi) (step A150-3), and transmits (Ei, CIDi)=(E(vi), CIDi) and Sei to the voting server 200 (step A150-4)

The processings up to transmission of the voting data are described above. The processings for receiving the voting data and tallying the votes after close of the votes will be described hereinafter, with reference to FIG. 9.

The voting server 200, upon receiving (Ei, CIDi) and Sek from the authentication server 300, confirms that Sek is the legitimate signature by the authentication server 300 for (Ei, CIDi), in the common-base-signature verification means 202 (step A8-1). The voting server 200 retrieves in the electorate list database 201 to assure that CIDi is registered and vote from CIDi is not received before (step A9-1), and registers (Ei, CIDi) and Sek in the voting-data storage device 204, and records in the electorate list database 201 the fact that the vote by CIDi is finished (step A10-1). The voting server 200, upon receiving (Ei, CIDi) and Sei from the voter terminal 140, 150, confirms that Sei is the legitimate signature of the voter i for (Ei, CIDi) by using the common-base-signature verification means 202 (step A8-2). The voting server 200 retrieves in the electorate list database 201 to assure that CIDi is registered therein and vote from CIDI is not received before (step A9-2), registers (Ei, CIDi) and Sek in the voting-data storage device 204, and records in the electorate list database 201 the fact that the vote by CIDi is finished (step A10-2).

After the vote is closed, the voting server 200 transmits the list of all the Ei recorded in the voting-data storage device 204, and the session ID transmitted to the anonymous decryption system 500 in step A2 to the anonymous decryption system 500 (step A11). The anonymous decryption system 500 decrypts the list of Ei based on the public information (p, q, g, Y) specified in session ID and the private key X, to create the list of plaintext voting data vj rearranged therefrom at random and certificate data z certifying presence of the one-to-one correspondence between the list of Ei and the list of vj (step A12), and returns the list of vj and the z to the voting server 200 (step A13). The voting server 200 tallies the votes based on the received plaintext voting data vj, and releases the result of tally (step A14).

Next, advantages of the present embodiment will be described.

In the present embodiment, the voting server 200 transmits encrypted voting data to the voter terminals 100, 110, 140, and the encryption servers 400, 410, 440 re-encrypt the encrypted voting data elected by the voters and transmit the resultant data to the voting server 200. Thus, even a voter terminal having no encryption means can perform a vote while securing the secrecy of the vote. In addition, since the voter terminals 100, 120 include the device-side certification means 103, 123 and the authentication server 300 includes the server-side certification means 301, a certification can be effected without using a digital signature, and even the voter terminals having no signature creation means can vote by transmitting the encrypted voting data to the voting server 200 while affixing the common-base digital signature of the authentication server 300. Further, since the voter terminals 100, 120 include the intra-organization-signature creation means 113, 133 and the authentication server 300 includes the intra-organization-signature verification means 302 and the ID coalition means 304, the encrypted voting data affixed with the intra-organization digital signature can be verified by the authentication server 300, and then transmitted to the voting server 200 while being affixed with the common-base signature of the authentication server 300 after the intra-organization identifier is converted into the common-base identifier, whereby all the voters can vote even if the voters are not registered in the common open-key authentication base.

Although the case wherein a single authentication server 300 is provided is described herein, different authentication servers may be provided for respective organizations if the voters belong to different organizations.

Second Embodiment

Figure 10:
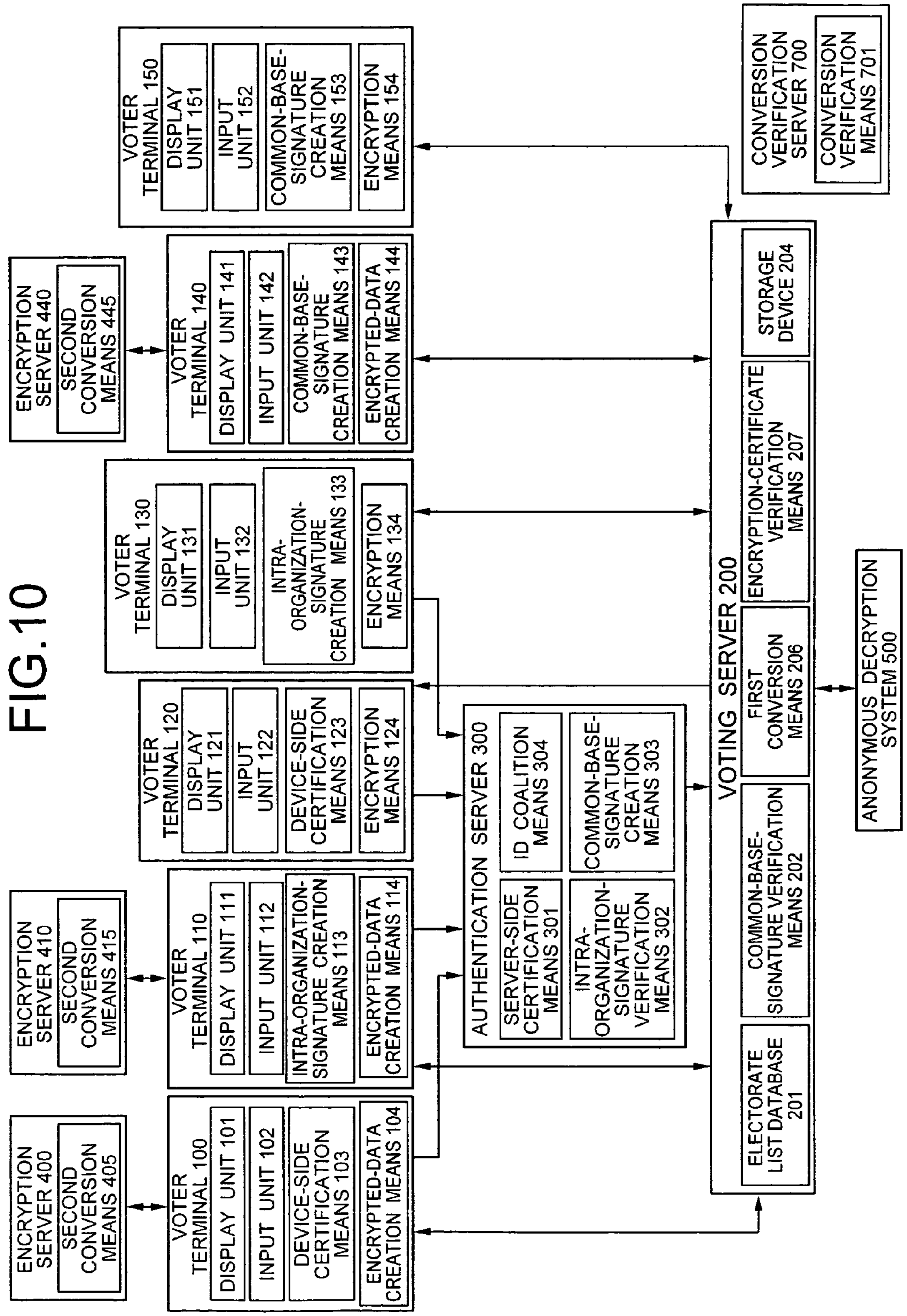
FIG. 10 is a block diagram showing the configuration of an anonymous electronic voting system according to a second embodiment

Next, a second embodiment of the present invention will be described with reference to drawings. The anonymous electronic voting system of the second embodiment shown in FIG. 10 is such that the voting terminals 100, 110, 140 include encrypted-data creation means 104, 114, 144, the encryption means 203 in the voting server 200 is replaced by a first conversion means 206 and an encryption-certificate verification means 207, the re-encryption means 401, 411, 441 are replaced by second conversion means 405, 415, 445, and a conversion verification server 700 including a conversion verification means 701 is provided, in the anonymous electronic voting system of the first embodiment shown in FIG. 1.

The first conversion means 206 receives the open information, and outputs first conversion data (first encryption parameters) and first conversion-certificate data.

The second conversion means 405, 415, 445 receives the public information, and outputs second conversion data (second encryption parameters) and second conversion-certificate data.

Encrypted data creation means 104, 114, 144 receives the public information, first conversion data, first conversion-certificate data, second conversion data, second conversion-certificate data and plaintext voting contents, and outputs the encrypted voting data E(i) and an encryption certificate which certifies that E(vi) is legitimately created.

The encryption-certificate verification means 207 receives the public information, encrypted voting data E(vi) and encryption-certificate data, and verify whether or not E(vi) is legitimately created.

The first conversion means 206, second conversion means 405, 415, 445, encrypted-data creation means 104, 114, 144, and encryption-certificate verification means 207 operate as described hereinafter, if the techniques described in Patent Publication 1 are applied to the anonymous decryption system 500.

The first conversion means 209, upon input of the public information (p, q, g, Y) thereto, selects a random number r smaller than q, and d at random, and calculates:

$$(Gr, Yr, r)=(g^{r} \bmod p, Y^{r} \bmod p, r),$$

to output first conversion data (Gr, Yr, r), and also calculates:

$$(Gd, d)=(g^{d} \bmod p, d)$$

to output first conversion-certificate data (Gd, d).

The second conversion means 405, 415, 445, upon input of the public information (p, q, g, Y) thereto, selects a random number s smaller than q, and calculates:

$$(Gs, Ys, s)=(g^{s} \bmod p, Y^{s} \bmod p, s)$$

to output second conversion data (Gs, Ys, s), and calculate:

$$(Gu, u)=(g^{u} \bmod p, u)$$

to output second conversion data (Gu, u). Here, u is a random number selected at random and smaller than q.

The encrypted-data creation means, upon input of the first conversion data (Gr, Yr, r), first conversion-certificate data (Gd, d), second conversion data (Gs, Ys, s), second conversion-certificate data (Gu, u), and plaintext voting contents vi, calculates:

$$E(vi)=(Gr \times Gs \bmod p, vi \times Yr \times Ys \bmod p)$$

to obtain encrypted voting data E(vi). In addition, the encrypted-data creation means calculates:

$$.=Gu \times Gd \bmod p;$$

$$c=\mathrm{HASH}(p,q,g,Y,Gi,Vi,.);\ \text{and}$$

$$t=c \times (r+s)+u+d \bmod q$$

to obtain the encryption-certificate data (., t) and output the encryption-certificate data (., t) in addition to the encrypted voting data (Gi, Vi).

The certificate using the encryption-certificate data is verified by the encryption-certificate verification means 207 calculating:

$$c=\mathrm{HASH}(p,q,g,Y,Gi,Vi,.),$$

and assuring whether or not the following relationship holds:

$$g^{t} \times Gi^{-c}=. \bmod p.$$

The conversion verification means 701 verifies whether or not the conversion data (Gr, Yr, r) and conversion-certificate data (Gd, d) are legitimately created based on the public information (p, q, g, Y). If the techniques described in Patent Publication 1 are used in the anonymous decryption system 500, the conversion verification means 701 receives the public information (p, q, g, Y), conversion data (Gr, Yr, r), and conversion-certificate data (Gd, d), and judges acceptable if all the following equations hold:

$$Gr=G^{r} \bmod p;$$

$$Yr=Y^{r} \bmod p;\ \text{and}$$

$$Gd=Y^{d} \bmod p,$$

and judges unacceptable if any one of those does not hold.

Figure 11:
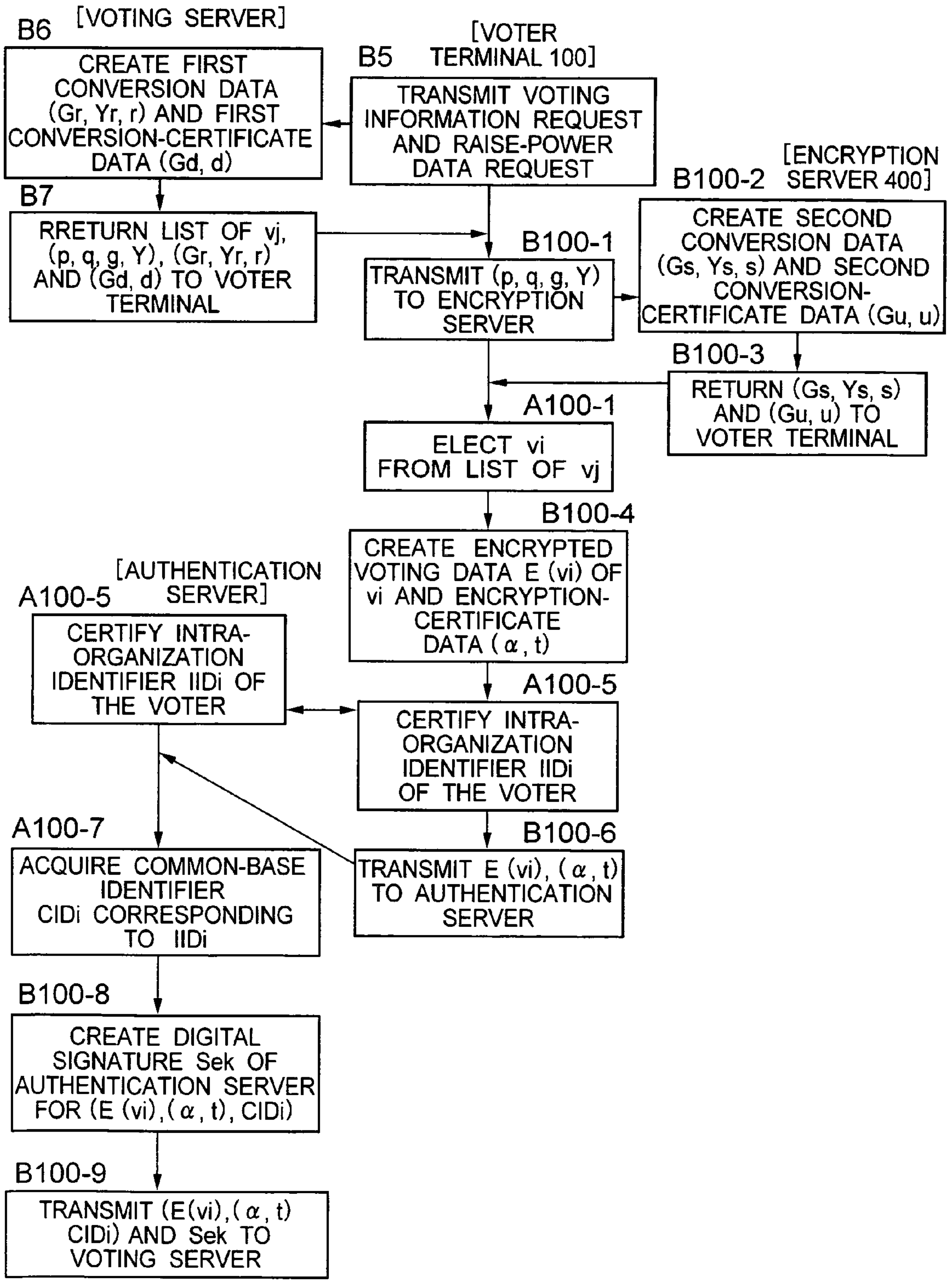
FIG. 11 is a flowchart showing operation of the voter terminal 100 in the second embodiment.
Figure 12:
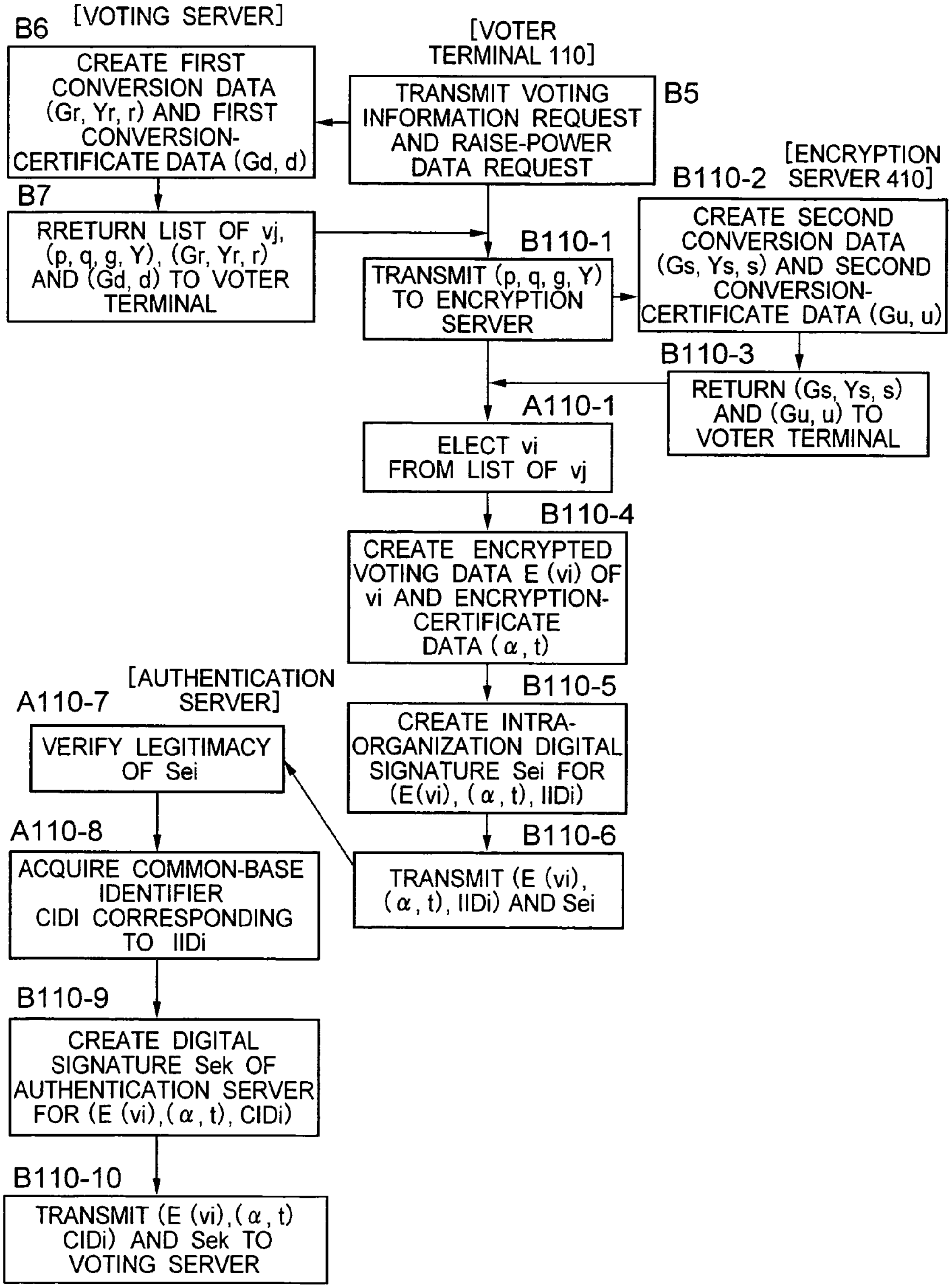
FIG. 12 is a flowchart showing operation of the voter terminal 110 in the second embodiment.
Figure 13:
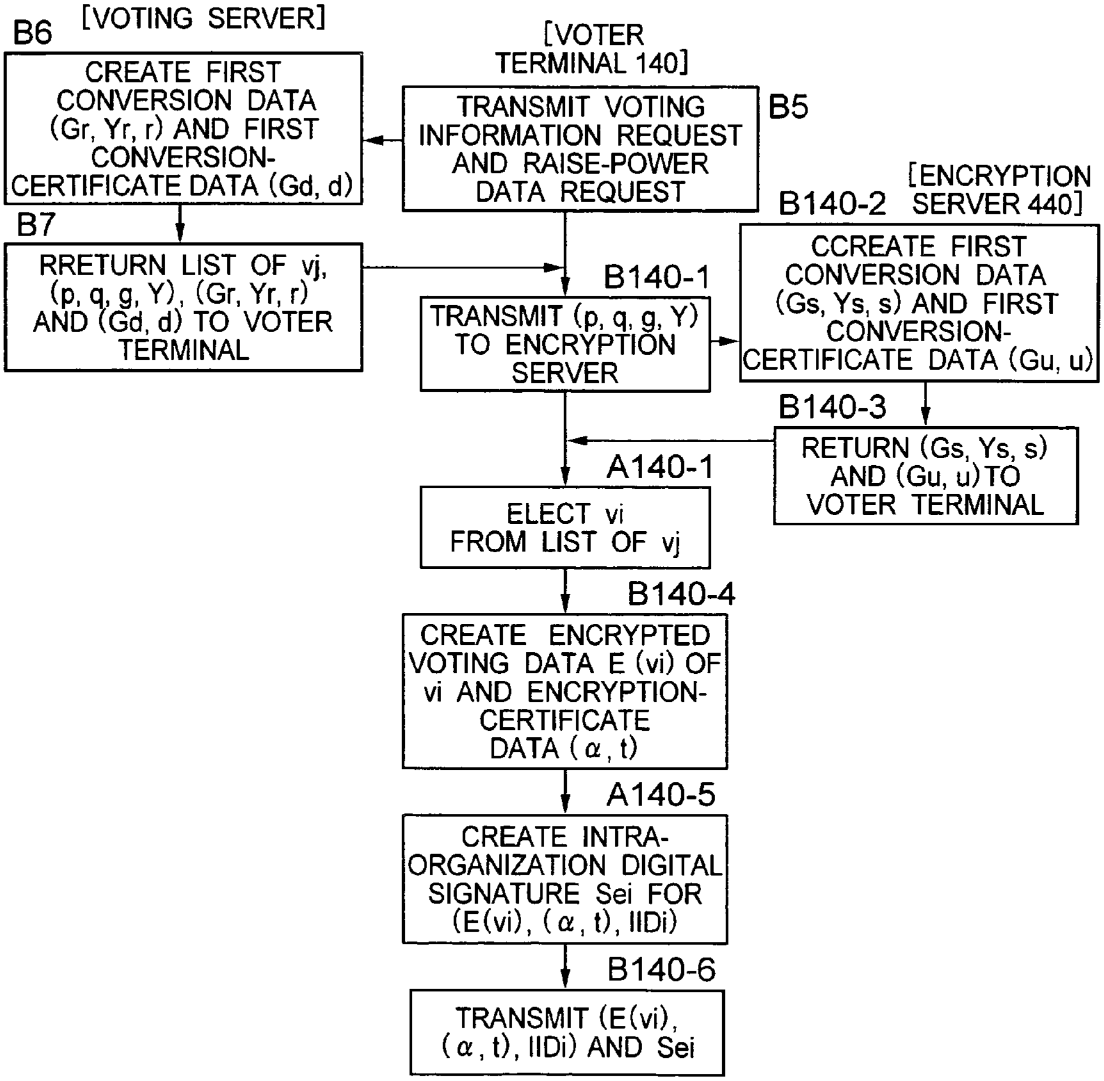
FIG. 13 is a flowchart showing operation of the voter terminal 140 in the second embodiment.
Figure 14:
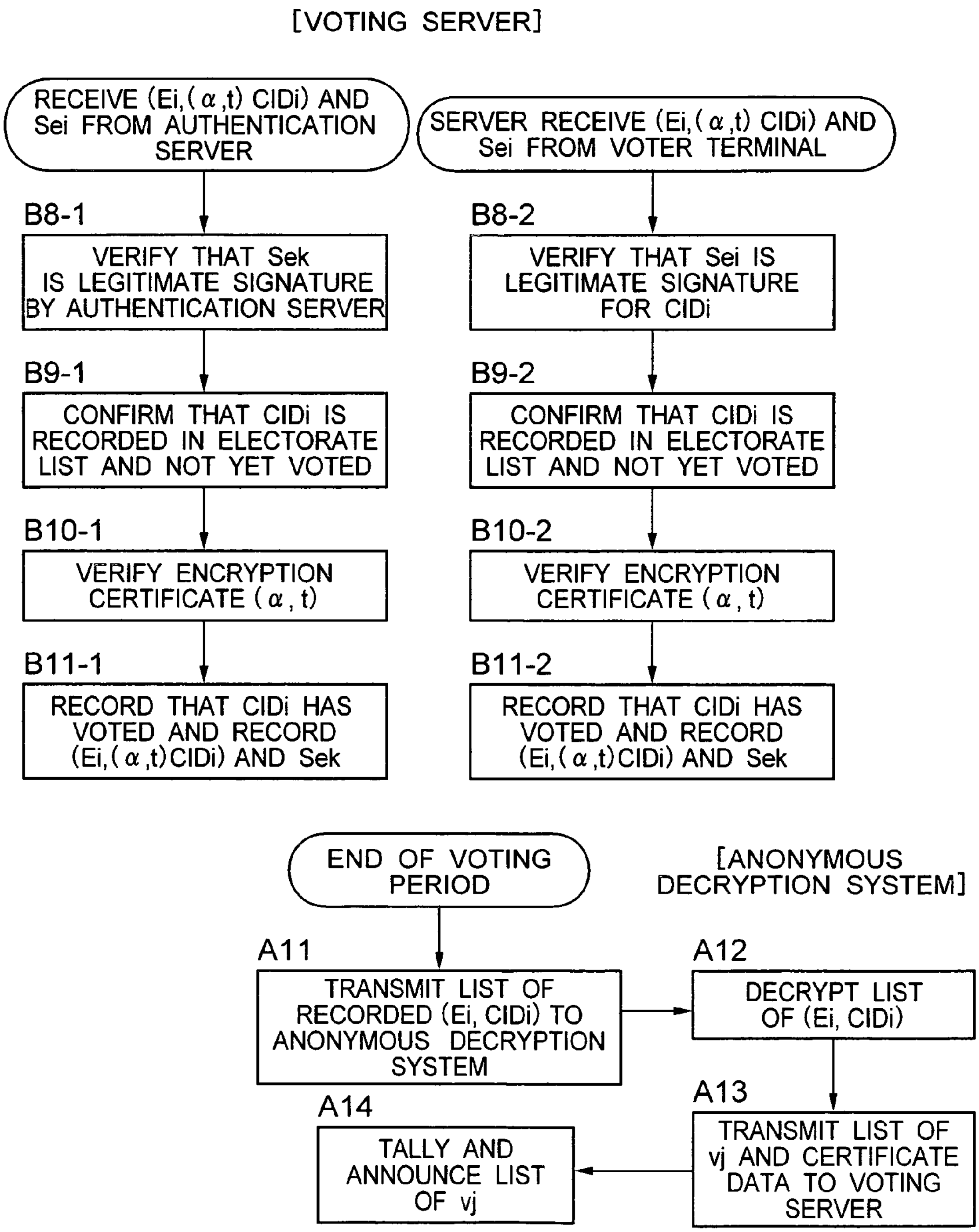
FIG. 14 is a flowchart showing operation of the voter terminal 200 in the second embodiment.

Next, operation of the anonymous electronic voting system of the present embodiment will be described. FIGS. 11 to 13 show processings in the voter terminals 100, 110, 140, respectively, (and processings by the voting server, authentication server, and encryption server relevant to the processings in those voter terminals), and FIG. 14 explains processings from the start of receiving the votes to the tally thereof. It is to be noted that the operation in the default in the present embodiment is similar to that in the first embodiment, and that operation of the voter terminals 120, 130, 150 is similar to that in the first embodiment, and thus those operations are omitted for description.

Hereinafter, processings from access to the voting server 200 by the voter terminal 100, 110, 140 to transmission of the voting data will be described.

The voter terminal 100, 110, 140 transmits a voting-information request and a conversion-data request to the voting server 200 (step B5 in FIGS. 11, 12, and 13). The voting server 200, upon receiving the conversion-data request, inputs the public information (p, q, g, Y) into the first conversion means 206, to create the first conversion data (Gr, Yr, r) and first conversion-certificate data (Gd, d) (step B6 in FIGS. 11, 12, 13), and returns these data (p, q, g, Y), (Gr(s), Yr(s), r) and (Gd, d) to the voter terminal 100, 110, 140 (step B7 in FIGS. 11, 12, 13). The voter terminals 100, 110, 140, upon receiving (p, q, g, Y), (Gr, Yr, r) and (Gd, d) from the voting server 200, transmit (p, q, g, Y) and a conversion-data request to the encryption server 400, 410, 440, respectively, (step B100-1, B110-1, B140-1 in FIGS. 11, 12, and 13,). The encryption servers 400, 410, 440, upon receiving the public information (p, q, g, Y) and conversion-data request, input the public information (p, q, g, Y) into the respective second conversion means 405, 415, 445, to create the second conversion data (Gs, Ys, s) and second conversion-certificate data (Gu, u) (steps B100-2, B110-2, B140-2 in FIGS. 11, 12, 13), and returns (Gs, Ys, s) and (Gu, u) to the voter terminals 100, 110, 140, respectively (steps B100-3, B110-3, B140-3 in FIGS. 11, 12, 13).

Hereinafter, part of processings up to the transmission of the voting data different from that of the first embodiment will be described separately for the respective voter terminals 100, 110, 140.

The voter terminal 100, as shown in FIG. 11, upon receiving the first conversion data (Gr, Yr, r), first conversion-certificate data (Gd, d), second conversion data (Gs, Ys, s) and second conversion-certificate data (Gu, u), inputs the voting contents vi input by the voter i, as well as (Gr, Yr, r), (Gd, d), (Gs, Ys, s) and (Gu, u) to the encryption creation means 104, to calculate encrypted voting data E(vi) and encryption-certificate data (., t) (step B100-4), and transmits E(vi) and (., t) to the authentication server 300 after certification of IIDi (step B100-6). The authentication server 300 creates the common-base digital signature Sek of the authentication server 300 for (E(vi), (., t), CIDi) (step B100-8), and transmits (E(vi) (., t), CIDi) and Sek to the voting server 200 (step B100-9)

The voter terminal 110, as shown in FIG. 12, upon receiving the first conversion data (Gr, Yr, r), first conversion-certificate data (Gd, d), second conversion data (Gs, Ys, s) and second conversion-certificate data (Gu, u), inputs the voting contents vi input by the voter i, as well as (Gr, Yr, r), (Gd, d), (Gs, Ys, s) and (Gu, u) to the encryption creation means 114, to calculate encrypted voting data E(vi) and encryption-certificate data (., t) (step B110-4). The voter terminal 110 then creates the intra-organization digital signature Sei for (E(vi), (., t), IIDi) (step B110-5), and transmits (E(vi), (., t), IIDi) and Sei to the authentication server 300 (step B110-6). The authentication server 300 confirms that Sei is the legitimate signature of IIDi for (E(vi), (., t), IIDi) (step B110-7), acquires a common identifier CIDi corresponding to IIDi from the ID coalition means 304 (step A110-8), creates the common-base digital signature Sek of the authentication server 300 for (E(vi), (., t), CIDi) (step B110-9), and transmits (Ei=E(vi) (., t), CIDi) and Sek to the voting server 200 (step B 110-10)

The voter terminal 140, as shown in FIG. 13, upon receiving the first conversion data (Gr, Yr, r), first conversion-certificate data (Gd, d), second conversion data (Gs, Ys, s) and second conversion-certificate data (Gu, u), inputs the voting contents input by the user as well as (Gr, Yr, r), (Gd, d), (Gs, Ys, s) and (Gu, u) into the encrypted-data creation means 144, to calculate the encrypted voting data E(vi) and encryption-certificate data (., t) (step B140-4). The voter terminal 140 then creates the common-base digital signature Sei for (E(vi), (., t), CIDi) (step B140-5), and transmits (Ei=E(vi), (., t), CIDi), and Sei to the voting server 200 (step B140-6).

The above description is directed to processings up to transmission of the voting data. Processings for reception of the voting data and subsequent thereto will be described hereinafter for the part different from that of the first embodiment, with reference to FIG. 14.

The voting server 200, upon receiving (Ei, (., t), CIDi), and Sek from the authentication server 300, confirms in the common-base-signature verification means 202 that Sek is the legitimate signature of the authentication server 300 for (Ei, CIDi) (step B8-1), confirms in the encryption-certificate verification means 207 that Ei is legitimately created (step B9-1), retrieves in the electorate list database 201 to confirm that CIDi is registered and that vote from CIDi has not been received (step B10-1), records (Ei, (., t), CIDi) and Sek in the voting-data storage device 204, and records the fact that vote from CIDi is finished in the electorate list database 201 (step B11-1). The voting sever 200, upon receiving (Ei, (., t), CIDi) and Sei from the voter terminals 140, 150, confirms in the common-base-signature verification means 202 that Sei is the legitimate signature of the voter i for (Ei, (., t), CIDi) (step B8-2), confirms in the encrypted-certificate verification means 207 that Ei is legitimately created (step B9-2), retrieves in the electorate list database 201 to confirm that CIDi is registered and vote from CIDi has not been accepted (step B10-2), records (Ei, CIDi) and Sek in the voting-data storage device 204, and records that the vote from CIDi is finished in the electorate list database 201 (step B11-2).

The voters having finished the vote through the own voter terminals 100, 110, 140, after the reception of the voting data, may input the public information (p, q, g, Y) received from the voting server, first conversion data and first conversion-certificate data (Gd, d) into the conversion certificate means 701 of the conversion verification server 700, to verify whether or not the first conversion data and the first conversion-certificate data are legitimately created from the public information (p, q, g, Y). The voter may also verify similarly whether or not the second conversion data (Gs, Ys, s) and conversion-certificate data (Gu, u) received from the encryption servers 400, 410, 440 are legitimately created from the public information (p, q, g, Y), by using the conversion verification means 701 of the conversion verification server 700.

Processings subsequent to close of the vote are similar to those in the first embodiment, and are omitted herein for description.

Next, advantages of the present embodiment will be described.

In the present embodiment, the configurations that the voting terminals 100, 110, 140 include the encrypted-data creation means 104, 114, 144, respectively, that the voting server 200 includes the first conversion means 206, and that the encryption server 400, 410, 440 include the second conversion means 405, 415, 445, respectively, allow the voter terminals 100, 110, 140 to create the encrypted voting data without performing a complicated calculation. Moreover, since the encrypted voting data is calculated based on both the first conversion data and second conversion data, each of the voting server 200 and encryption servers 400, 410, 440 alone cannot know the plaintext voting contents from the encrypted voting data of the voter. In addition, the encryption-certificate data created by the encrypted-data creation means 104, 114, 144 can be verified by the processing same as the processing for the encryption-certificate data created by the encryption means 124, 134, 154 of the voter terminal 120, 130, 150. Further, since the voter terminals 100, 110, 140 include the encrypted-data creation means 104, 114, 144, respectively, the present embodiment is applicable not only to the vote wherein the voting contents such as the candidate names are fixed in advance but also to the vote (questionnaire) of free description wherein the voter decides the voting contents at his discretion Further, by using the conversion verification means 701, whether or not the first conversion data and first conversion-certificate data transmitted from the voting server 200 as well as the second conversion data and second conversion-certificate data transmitted from the encryption server 400, 410, 440 are legitimately created from the public information (p, q, g, Y) can be verified. Accordingly, if the voting server 200 or the encryption servers 400, 410, 440 intend to impede the vote by transmitting illegitimate conversion data or conversion-certificate data to a voter terminal, the illegitimate act will be revealed. This suppresses the illegitimate act by the voting server 200 or the encryption servers 400. 410, 440.

Third Embodiment

Figure 15:
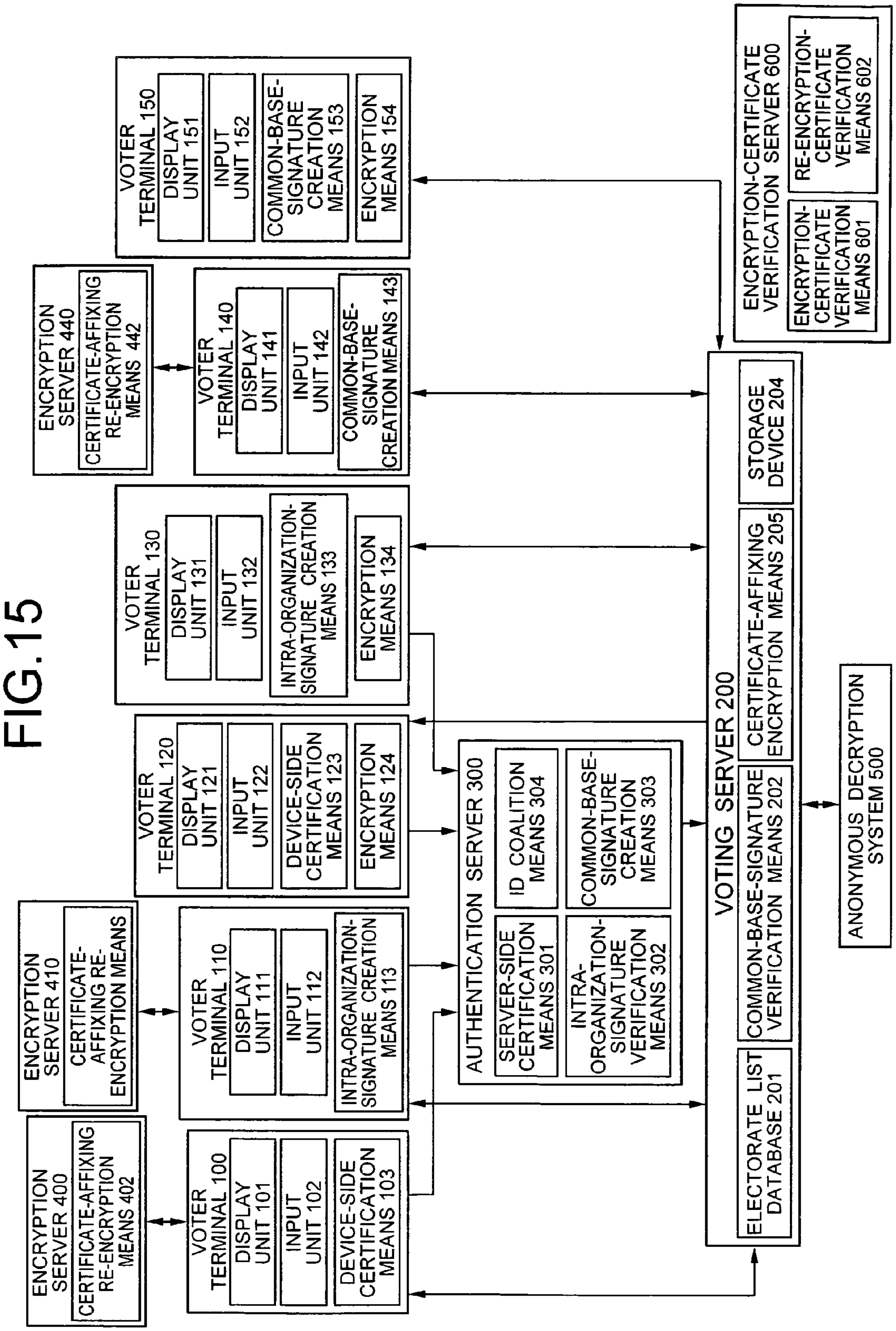
FIG. 15 is a block diagram showing the configuration of an anonymous electronic voting system according to a third embodiment.

Next, a third embodiment of the present invention will be described with reference to the drawings. The anonymous electronic voting system of the third embodiment shown in FIG. 15 is such that an encrypted-certificate verification server 600 is further provided, an certificate-affixing encryption means 205 is provided instead of the encryption means 203 in the voting server 200, certificate-affixing re-encryption means 402, 412, 442 are provided instead of the re-encryption means 401, 411, 441 of the encryption server 400, 410, 440, respectively, and a encryption-certificate verification means 601 and a re-encryption-certificate verification means 602 are provided in the encryption-certificate verification server 600, in the anonymous electronic voting system of the first embodiment shown in FIG. 1.

The certificate-affixing encryption means 205 receives the public information including encryption public key Y and plaintext data v, and outputs E(v) obtained by encrypting v based on Y and certificate data w showing that E(v) is obtained by legitimately encrypting v based on Y. The certificate-affixing re-encryption means 402, 412, 442 receives the public information including the encryption public key Y and encrypted data E(v), and outputs E'(v) obtained by re-encrypting E(v) based on Y and certificate data w' showing that E'(v) is obtained by legitimately re-encrypting E(v) based on Y.

The encryption-certificate verification means 601 receives the public information including the encryption public key Y and the plaintext data v, and verifies whether or not E(v) is obtained by legitimately encrypting v based on Y. The re-encryption-certificate verification means 602 receives the public information including the encryption public key, encrypted data E(v), re-encrypted data E'(v) obtained by re-encrypting E(v), and certificate data w', and verifies whether or not E'(v) is obtained by legitimately encrypting E(v) based on Y.

If the techniques described in Patent Publication 1 are used, the certificate-affixing encryption means 205 receives the public information (p, q, g, Y) and plaintext voting data vi, and outputs the encrypted voting data E(vi) and certificate data w. E(vi) is expressed by the pair (Gi, Vi) and obtained by calculating:

$$(Gi, Vi)=(g^r \bmod p, vi \times Y^r \bmod p).$$

Here, r is a random number selected at random for the plaintext voting data vi. Thus, r is output as the certificate data w.

The certificate-affixing re-encryption means 205 receives the public information (p, q, g, Y) and encrypted voting data E(vi)=(Gi, Vi), and outputs the encrypted voting data E'(vi) and certificate data w'. E'(vi) is expressed by the pair (G'i, V'i) and obtained by calculating:

$$(G'i, V'i)=(Gi^s \bmod p, Vi \times Y^s \bmod p).$$

Here, s is a random number selected at random for the plaintext voting data vi. Thus, s is output as the certificate data w'.

The encryption-certificate verification means 601 receives vi, (p, q, g, Y), E(vi)=(Gi, Vi) and w, judges the certificate to be acceptable if both the following equations:

$$Gi=G^e \bmod p; \text{ and}$$

$$Vi=vi \times Y^w \bmod p$$

hold, and judges the certificate to be illegitimate if any one of them does not hold.

The re-encryption-certificate verification means 602 receives (Gi, Vi), (p, q, g, Y), E'(vi)=(G'i, V'i) and w, judges the certificate to be acceptable if both the following equations:

$$G'i=Gi^{w'} \bmod p; \text{ and}$$

$$V'i=Vi \times Y^{w'} \bmod p$$

hold, and judges the certificate to be illegitimate if any one of them does not hold.

Figure 16:
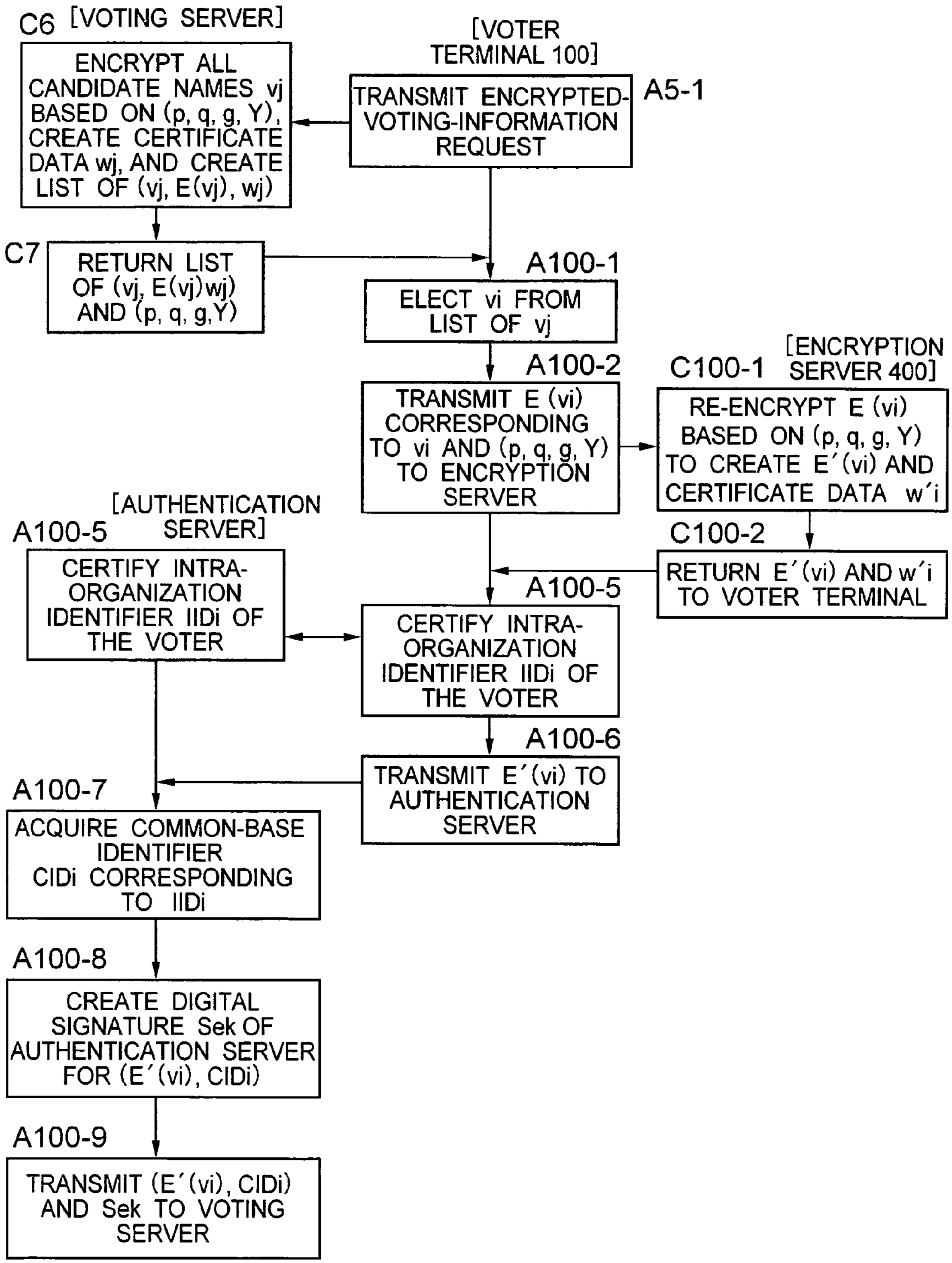
FIG. 16 is a flowchart showing operation of the voter terminal 100 in the third embodiment.
Figure 17:
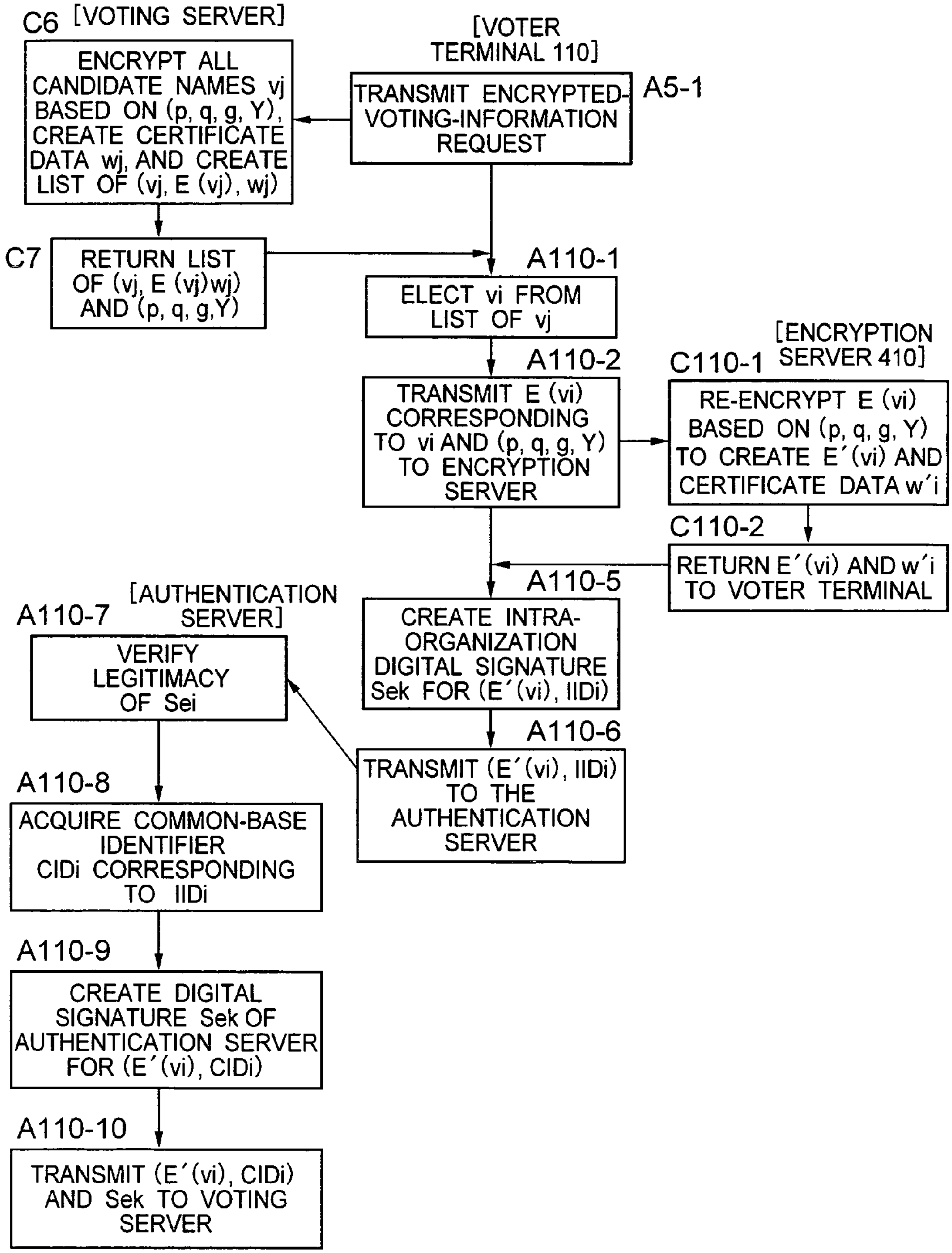
FIG. 17 is a flowchart showing operation of the voter terminal 110 in the third embodiment.
Figure 18:
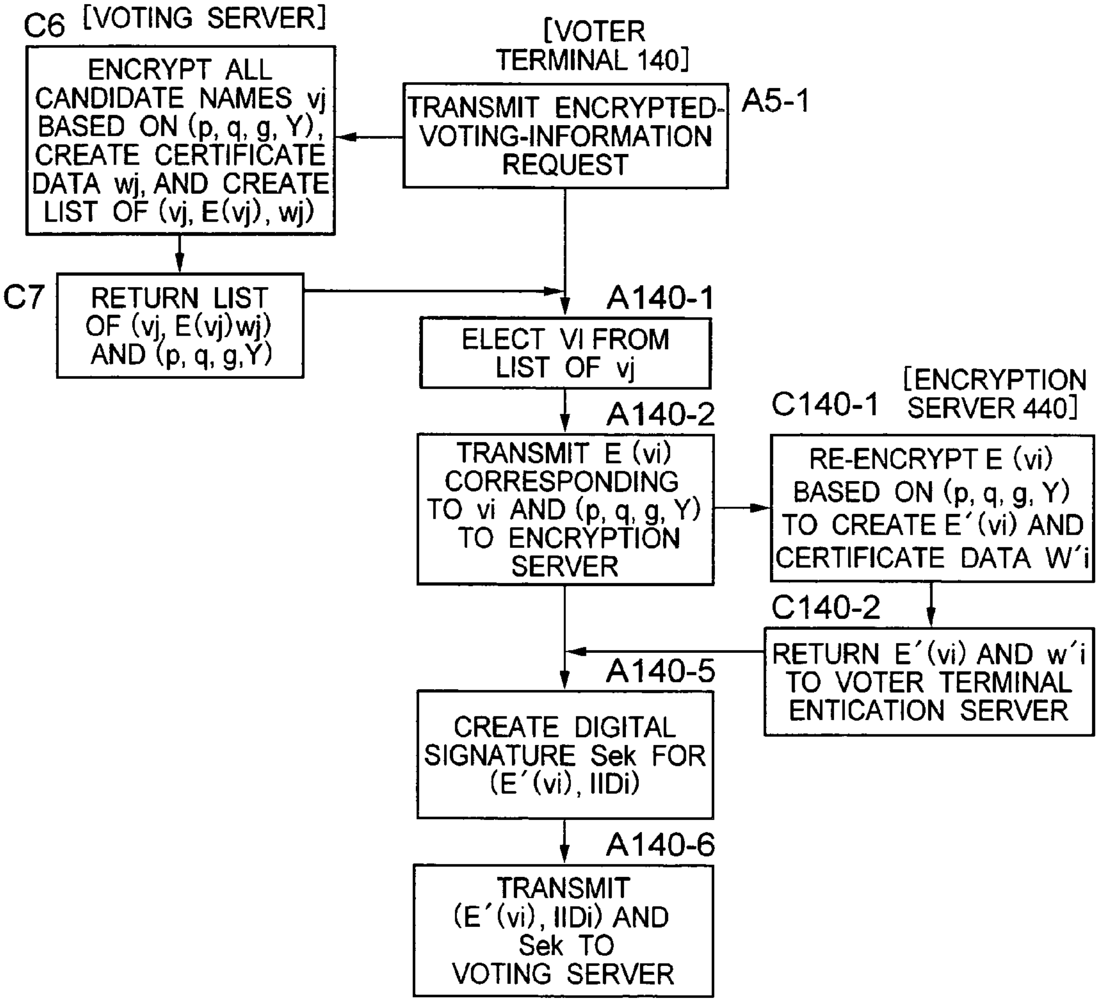
FIG. 18 is a flowchart showing operation of the voter terminal 140 in the third embodiment.
Figure 19:
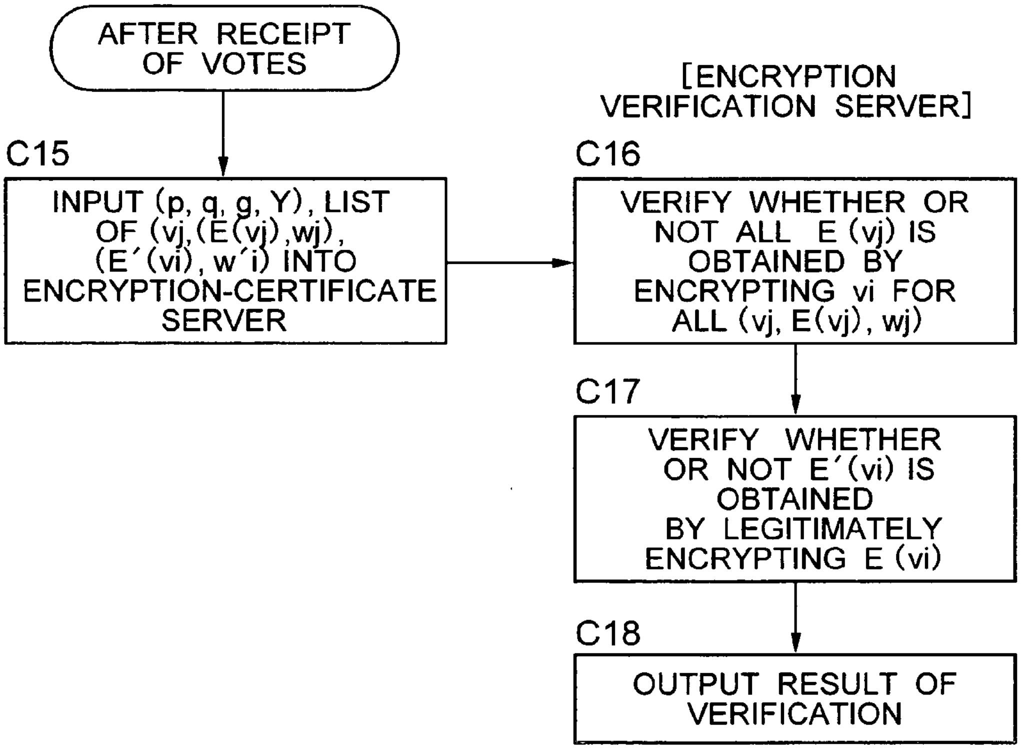
FIG. 19 is a flowchart showing operation of the encryption server 600 in the third embodiment.

Next, operation of the anonymous electronic voting system of the present embodiment will be described. FIGS. 16 to 18 show processings of the voter terminals 100, 110, 140, respectively (and processings by the voting server, authentication server and encryption server relevant to the processings in the voter terminals). FIG. 19 explains processings corresponding to the operation from the reception of the votes to the tally thereof. The operation of the default in the present embodiment is similar to that in the first embodiment, and the operation of the voter terminals 120, 130, 150 is similar to that in the present embodiment. Thus, those operations are omitted for description.

Hereinafter, processings from the access to the voting server 200 by the voter terminals 100, 110, 140 to transmission of the voting data will be described.

The voter terminals 100, 110, 140 transmit an encrypted-voting-information request to the voting server 200. The voting server 200, upon receiving the encrypted-voting-information request, creates E(vj) by encrypting vj for all the voters vj based on the public information (p, q, g, Y) in the certificate-affixing encryption means 205, creates the certificate certifying that E(vj) is obtained by legitimately encrypting vj based on the public information (p, q, g, Y) (step C6 in FIGS. 17, 18, 19), and returns the public information (p, q, g, Y) and the list of (vj, E(vj), wj) to the voter terminals 100, 110, 140 (step C7 in FIGS. 16, 17, 18).

The encryption servers 400, 410, 440, upon receiving E(vi) and the public information (p, q, g, Y) from the voter terminals, input E(vi) and (p, q, g, Y) into the certificate-affixing re-encryption means 402, 412, 442, respectively, to create E'(vi) by re-encrypting E(vi) and certificate data w'i which certificate that E'(vi) is obtained by legitimately encrypting E(vi) based on (p, q, g, Y) (steps C100-1, C110-1, C140-1 in FIGS. 16, 17, 18), and returns E'(vi) and w'i to the voting terminals 100, 110, 140 (steps C100-2, C110-2, C140-2 in FIGS. 16, 17, 18).

The above description is directed to part of the processings up to transmission of the voting data, which is different from that of the first embodiment.

Next, processings after reception of the votes will be described with reference to the flowchart of FIG. 19.

The voters having performed the vote through the voter terminals 100, 110, 140, after the reception of the voting data, transmits the public information (p, q, g, Y) and list of (vj, E(vj), wj) received from the voting server 200 as well as (E'(vi), w'i) received from the encryption server to the encryption-certificate verification server 600 (step C15). The encryption-certificate verification server 600 inputs the public information (p, q, g, Y) and the list of (vj, E(vj), wj) into the encryption-certificate verification means 601, to verify whether or not all E(vj) are obtained by legitimately encrypting vj based on (p, q, g, Y) (step C16), and also inputs (E'(vi), E(vi), w') into the re-encryption verification means 602, to verify whether or not E'(vi) is obtained by legitimately encrypting E(vi) based on (p, q, g, Y) (step C17), thereby outputting the results of verification (step C18).

Next, the advantages of the present embodiment will be described.

In the present embodiment, the voting server 200 includes the certificate-affixing encryption means 205, wherein the list of (vj, E(vj), wj) is transmitted to the voting terminals, the encryption-certificate verification means 601 can verify whether or not the E(vj) is obtained by legitimately encrypting vj based on (p, q, g, Y). Accordingly, if the voting server 200 transmits (vj, E(v'j), w) to the voting terminals by pretending that (vj, E(v'j), w) is obtained by encrypting vj, the illegitimacy will be revealed. This suppresses the illegitimate act by the voting server 200.

In addition, the encryption servers 400, 410, 440 include the certificate-affixing re-encryption means 402, 412, 442, respectively, wherein E'(vi), E(vi), w' are transmitted to the voter terminals, and the encryption-certificate verification means 602 can verify whether or not E'(vi) is obtained by legitimately encrypting E(vi) based on (p, q, g, Y). Accordingly, if the encryption server returns E'(v), E(vi), w' while pretending that E(vi) is legitimately re-encrypted, such an illegitimacy will be revealed. This suppresses the illegitimate act by the encryption servers 400, 410, 440.

In addition, although the configuration wherein the encryption-certificate verification means 601 is provided in another server (encryption-certificate verification server 600) to verify after the voting is finished, another configuration may be employed wherein the encryption-certificate verification is provided in the voter terminal as a constituent element thereof to conduct the verification during the voting. Further, another configuration may be employed wherein the verification means is provided in the encryption server as a constituent element thereof to verify only the certificate of encryption by the encryption during the voting, and to verify only the certificate data by the encryption server after the voting. Further, another configuration may be employed wherein the encryption-certificate verification means 601 and re-encryption-certificate verification means 602 are provided in the voter terminal, to perform all the verification during the voting.

Fourth Embodiment

Next. a fourth embodiment of the present invention will be described with reference to the drawings. In the anonymous electronic voting system of the first embodiment, by allowing a single voter terminal to use a plurality of encryption servers, the secrecy of the vote can be more robustly secured. The present embodiment includes a more number of the encryption servers for a single voter terminal.

Figure 20:
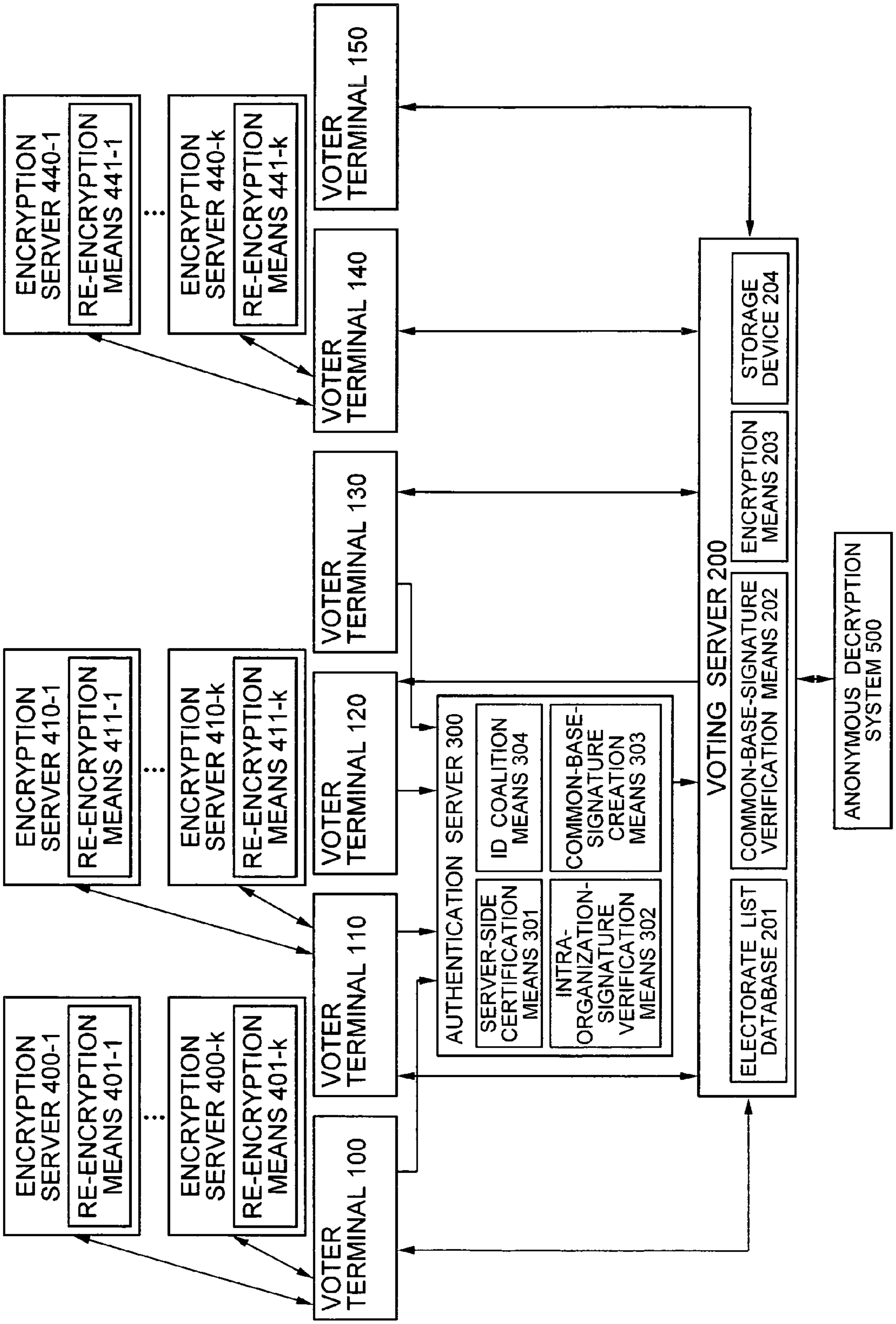
FIG. 20 is a block diagram showing the configuration of an anonymous electronic voting system according to a fourth embodiment.

The anonymous electronic voting system of the fourth embodiment shown in FIG. 20 is such that, the voter terminal 100 connects to k encryption servers 400-1 to **400-*k*, with k being an integer equal to or larger than 2, and similarly the voter terminals 110, 140 connect to encryption servers 410-1 to 410-*k* and encryption servers 440-1 to 440-*k*, respectively, in the anonymous electronic voting system the first embodiment shown in FIG. 1. The encryption servers 400-1 to 400-*k*, 410-1 to 410-*k*, and 440-1 to 440-*k* include the re-encryption means 401-1 to 401-*k*, 411-1 to 411-*k*, and 441-1 to 441-*k*, respectively. The configuration of the voter terminals 100, 110, 120, 130, 140, 150, voting server 200, and authentication server 300 is similar to that in the first embodiment shown in FIG. 1**.

Figure 21:
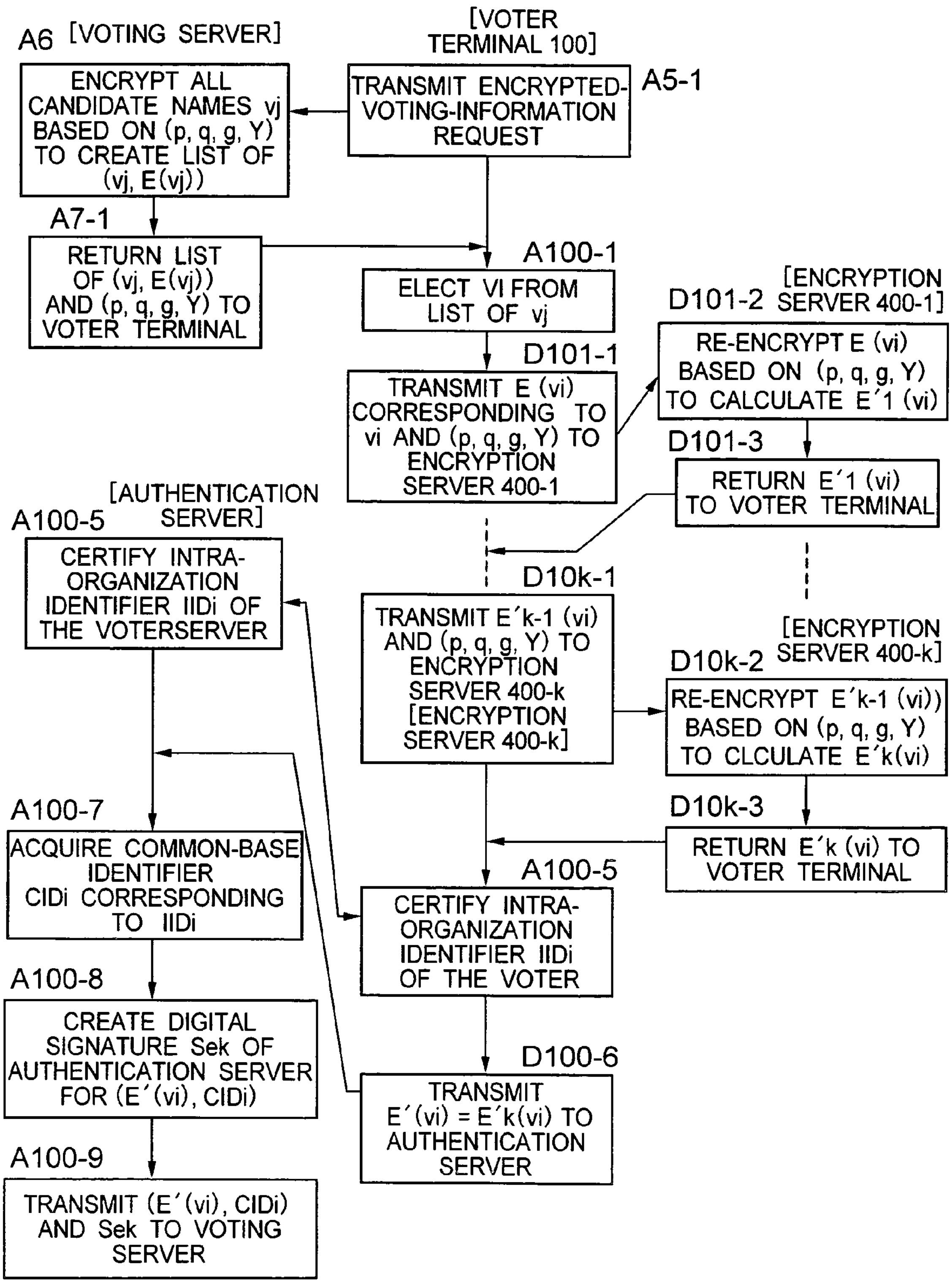
FIG. 21 is a flowchart showing operation of the voter terminal 100 in the fourth embodiment.
Figure 22:
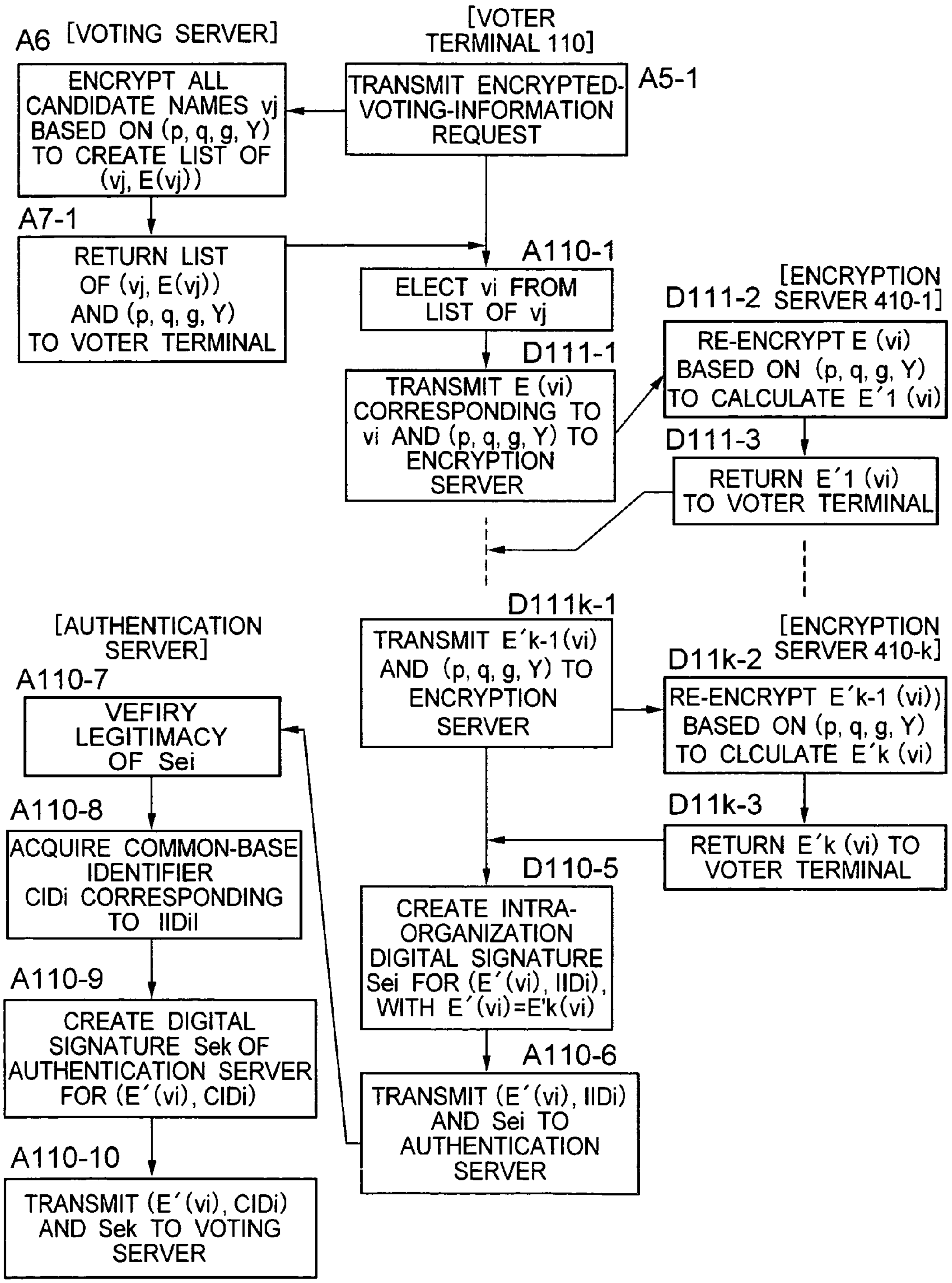
FIG. 22 is a flowchart showing operation of the voter terminal 110 in the fourth embodiment.
Figure 23:
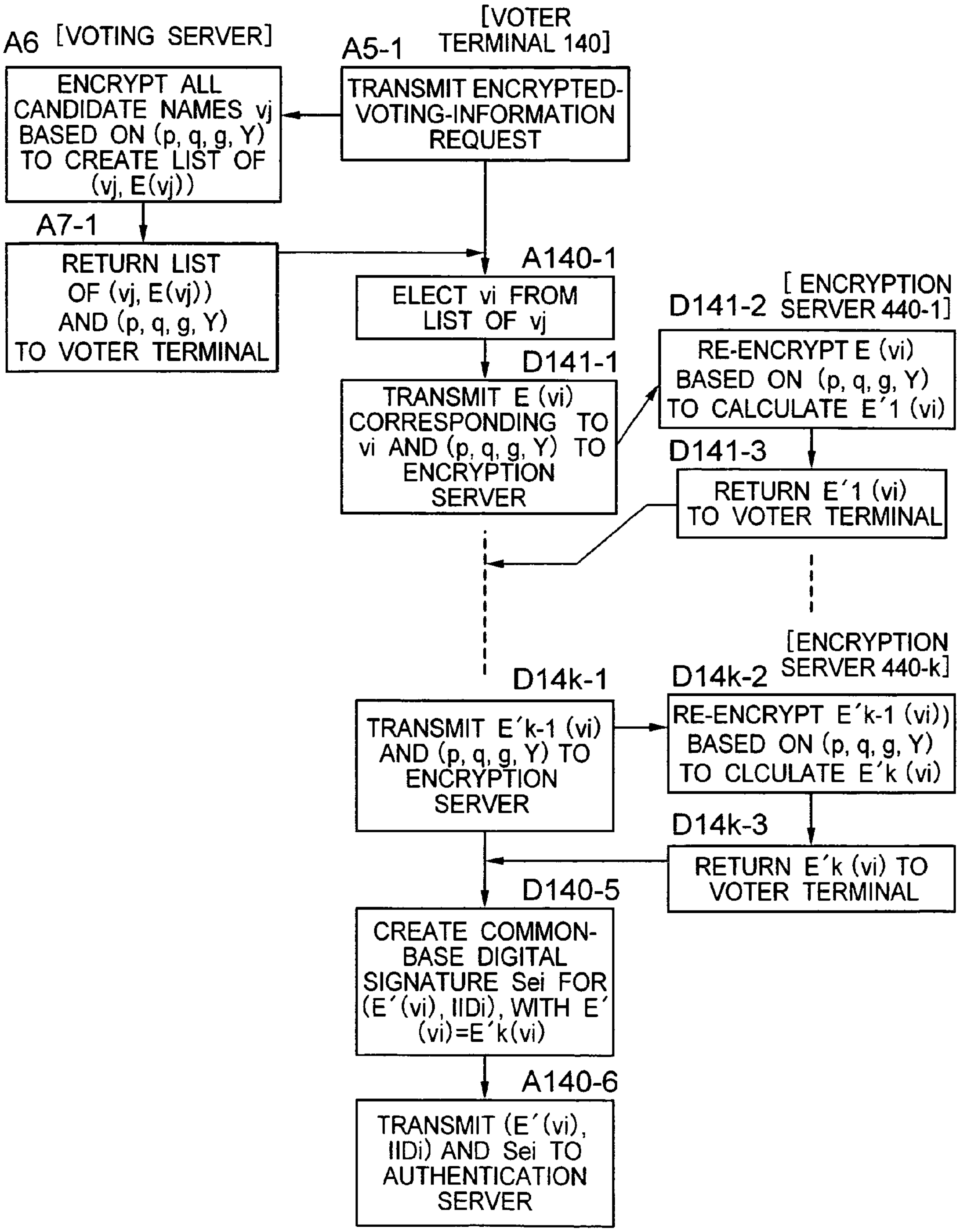
FIG. 23 is a flowchart showing operation of the voter terminal 140 in the fourth embodiment.

Next, operation of the anonymous electronic voting system of the present embodiment will be described. FIGS. 21 to 23 show processings by the voter terminals 100, 110, 140 (and processings by the voting server, authentication server and encryption server, relevant to processings in the voter terminals). It is to be noted that operation in the default of the present embodiment is similar to that in the first embodiment, and that the operation by the voter terminals 120, 130, 150 are similar to that in the first embodiment. Thus these operations are omitted herein for depiction.

Hereinafter, processings from the access to the voting server 200 by the voter terminal 100, 110, 140 to transmission of voting data will be described.

The voter terminals 100, 110, 140 transmit an encrypted-voting-information request to the voting server 200 (step A5-1 in FIGS. 21, 22, 23). The voting server 200, upon receiving the encrypted-voting-information request, encrypts all the candidate names vj based on the public information (p, q, g, Y), to create E(vj) in the encryption means 203 (step A6 in FIGS. 21, 22, 23), to return the public information (p, q, g, Y) and list of (vj, E(vj)) to the voter terminals 100, 110, 140 (step A7-1 in FIGS. 21, 22, 23). The voter terminals, upon receiving (p, q, g, Y) and the list of (vj, E(vj)), displays the list of vj to the voter on the display units 101, 111, 141, the voter elects and inputs a candidate vi from the list of vj via the input units 102, 112, 142 (steps A100-1 A100-1, A140-1 in FIGS. 21, 22, 23).

The voter terminals 100, 110, 140 then transmit the encrypted data E(vi) corresponding to vi and public information (p, q, g, Y) to the first encryption servers 400-1, 410-1, 440-1 (steps D101-1, D111-1, D141-1 in FIGS. 21, 22, 23). The encryption servers 400-1, 410-1, 440-1 input the received encrypted data E(vi) and public information (p, q, g, Y) into the re-encryption means 401-1, 410-1, 440-1, respectively, to calculate E'1(vi) by re-encrypting E(vi) (steps D101-2, D111-2, D141-2 in FIGS. 21, 22, 23), and return E'1(vi) to the voter terminals 100, 110, 140 (steps D101-3, D111-3, D141-3 in FIGS. 21, 22, 23). Subsequently, the voter terminals 100, 110, 140 transmit E'1(vi) obtained from the first encryption servers 400-1, 410-1, 440-1 to the second encryption servers 400-2, 410-2, 440-2, allowing E'1(vi) to be encrypted again to thereby obtain E'2(vi). Hereinafter, these processings are iterated for all the encryption servers 400-1 to **400-*k*, 410-1 to 410-*k*, and 440-1 to 440-*k*, to obtain the encrypted data E'k(vi) (steps D10*k*-3, D11*k*-3, D14*k*-3 in FIGS. 21, 22, 23). The encrypted data E'k(vi) corresponds to the data obtained by re-encrypting E(vi) for k times. The voter terminals 100, 110, 140 determine E'k(vi) as the encrypted data E'(vi) to be transmitted to the authentication server 300 or voting server 200 (steps D100-6, D110-5, D140-5 in FIGS. 21, 22, 23**). Subsequent processings are similar to those in the first embodiment.

Next, the advantages of the present embodiment will be described.

In the present embodiment, the voter terminals connect to the encryption servers 400-1 to **400-*k*, encryption servers 410-1 to 410-*k*, and encryption servers 440-1 to 440-*k*, respectively, and transmit the encrypted data E'(vi), obtained by re-encrypting E(vi) transmitted from the voting server 200 for the total of k times, to the voting server 200**. Accordingly, unless all of the voting server and k encryption servers collude together, the plaintext voting contents vi cannot be detected from E'(vi), and the secrecy of the votes can be strongly assured.

It is to be noted that although the number of encryption servers connected to the voter terminals 100, 110, 140 is k for each herein, this number need not be the same and may be different for them. In addition, some voter terminals may share some encryption servers as in the case of the first embodiment.

Moreover, as in the third embodiment shown in FIG. 15, each encryption server may include a certificate-affixing re-encryption means, to create certificate data for the encryption.

Fifth Embodiment

Next, a fifth embodiment of the present invention will be described with reference to the drawings. In the anonymous electronic voting system of the second embodiment, by allowing a single voter terminal to use a plurality of encryption servers, the secrecy of the votes can be more robustly secured. The present embodiment is such that a larger number of encryption servers are employed corresponding to a single voter terminal.

Figure 24:
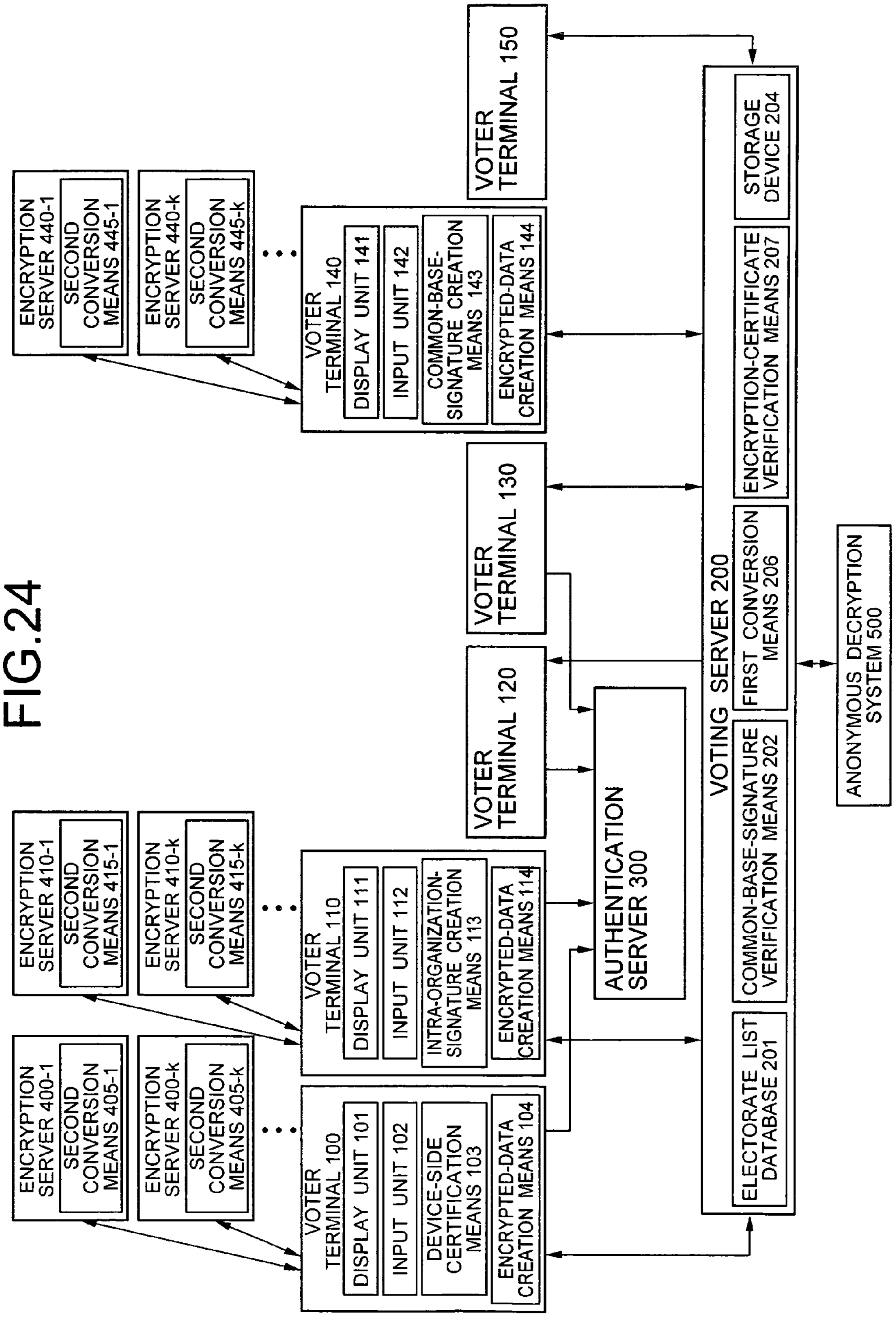
FIG. 24 is a block diagram showing the configuration of an anonymous electronic voting system according to a fifth embodiment.

The anonymous electronic voting system of the fifth embodiment shown in FIG. 24 is such that, the voter terminal 100 connects to k encryption servers 400-1 to **400-*k*, with k being an integer equal to or larger than 2, and the voter terminals 110, 140 connect to the encryption servers 410-1 to 410-*k* and encryption servers 440-1 to 440-*k*, respectively, in the anonymous electronic voting system of the second embodiment shown in FIG. 10. The encryption servers 400-1 to 400-*k*, 410-1 to 410-*k*, and 440-1 to 440-*k* include second conversion means 405-1 to 405-*k*, 415-1 to 415-*k*, and 445-1 to 445-*k*. For an m satisfying 1.m.k, the second conversion means 405-*m*, 415-*m*, 445-*m* of the m-th encryption servers 400-*m*, 410-*m*, 440-*m*** create the second conversion data (Gsm, Ysm, sm) and second conversion-certificate data (Gum, um). Here:

$$(Gsm, Ysm, sm) = (g\hat{\ }sm \bmod p, Y\hat{\ }sm \bmod p, sm);\text{ and}$$

$$(Gum, um) = (g\hat{\ }um \bmod p, um).$$

The encrypted-data creation means 104, 114, 144 of the voter terminals 100, 110, 140, upon input of the first conversion data (Gr, Yr, r)=(g^r mod p, Y^r mod p, r) and first conversion-certificate data (Gd, d)=(g^r mod p, d) from the voting server, and input of the k second conversion data (Gs1, Ys1, s1) to (Gsk, Ysk, sk) and k conversion-certificate data (Gu1, u1) to (Guk, uk) from the k encryption servers as well as the plaintext voting contents, calculate the encrypted voting data E(vi) based on the following equation:

$$E(vi) = (Gi, Vi)$$
$$= (Gr \times Gs1 \times Gs2 \times \ldots \times Gsk \bmod p,$$
$$vi \times Yr \times Ys1 \times Ys2 \times \ldots \times Ysk \bmod p).$$

Furthermore, the encrypted-data creation means 104, 114, 144 calculate:

$$a = Gu \times Gd1 \times Gd2 \times \ldots \times Gdk \bmod p;$$

$$c = \mathrm{HASH}(p,q,g,Y,Gi,Vi,a);$$

$$t = c \times (r + s1 + s2 + -- + sk) + u + d1 + d2 + \ldots + dk \bmod q,$$

to obtain encryption-certificate data (., t) and output the same together with the encrypted voting data (Gi, Vi).

This certificate can be verified in the encryption-certificate verification means 207 by calculating:

$$c = \mathrm{HASH}(p,q,g,Y,Gi,Vi,a),$$

and confirming whether or not the following relationship holds:

$$g\hat{\ }t \times Gi\hat{\ }\{-c\} = a \bmod p.$$

The configuration of the voter terminals 120, 130, 150, voting server 200, and authentication server 300 is similar to that of the second embodiment shown in FIG. 10.

Figure 25:
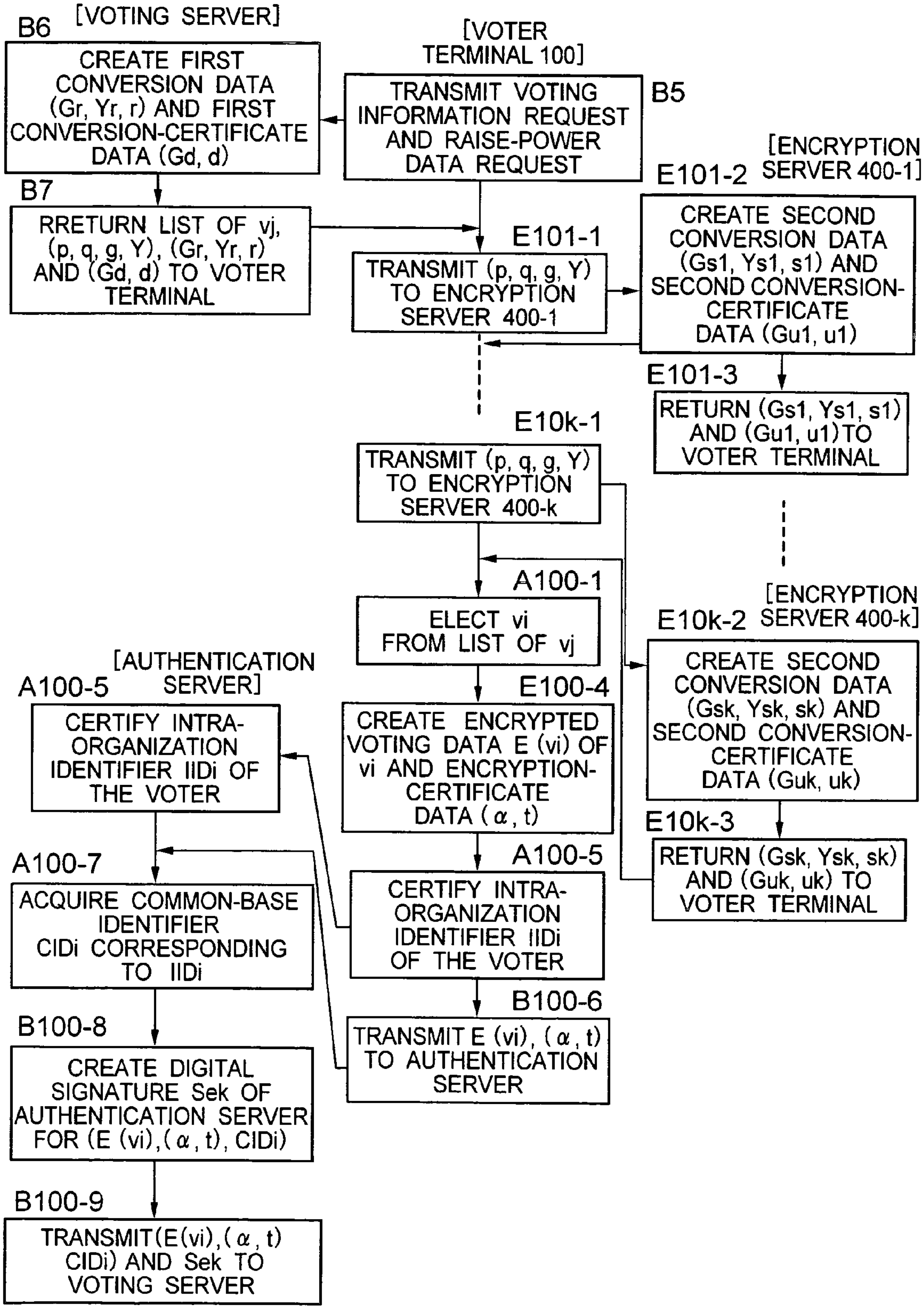
FIG. 25 is a flowchart showing operation of the voter terminal 100 in the fifth embodiment.
Figure 26:
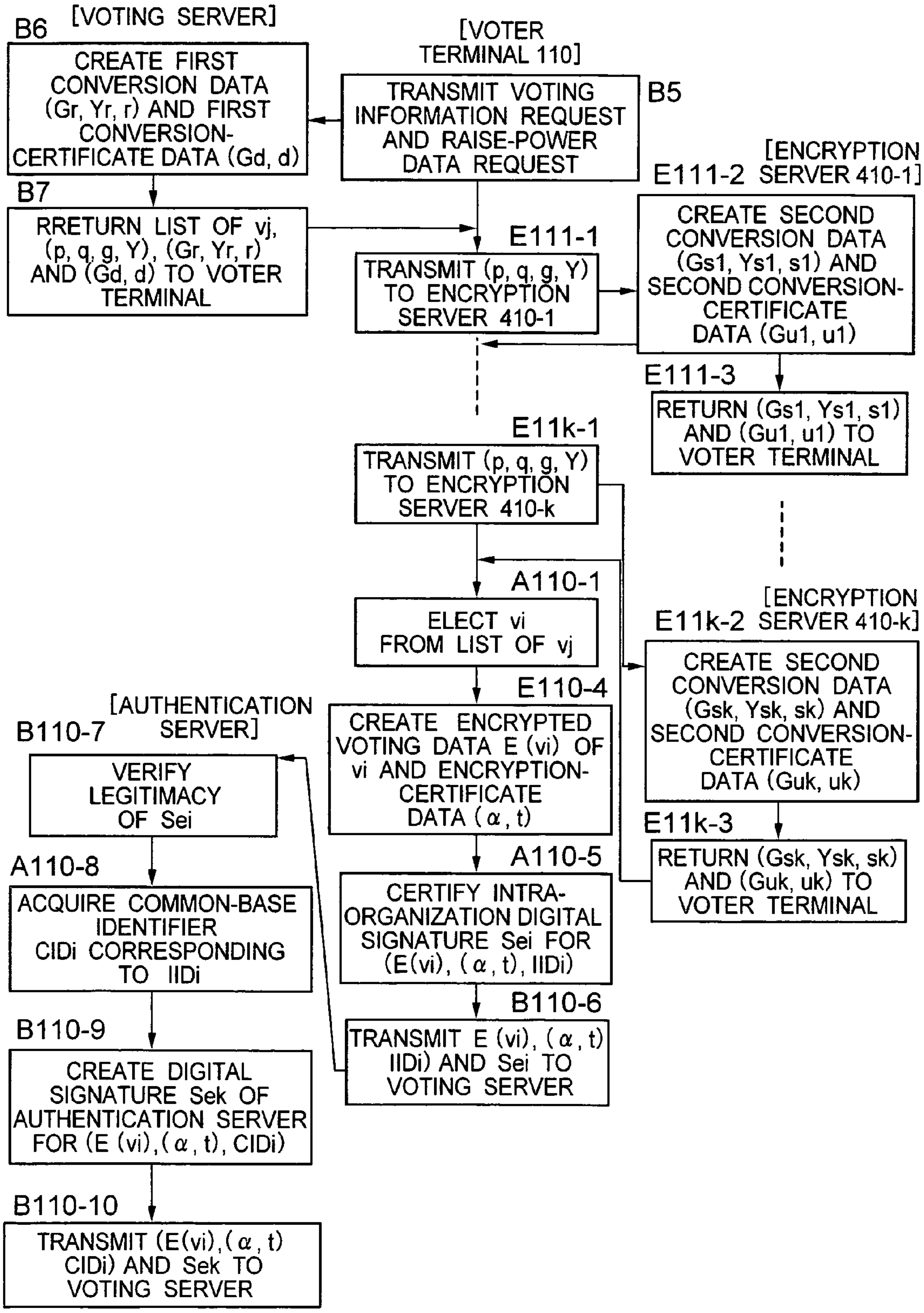
FIG. 26 is a flowchart showing operation of the voter terminal 110 in the fifth embodiment.
Figure 27:
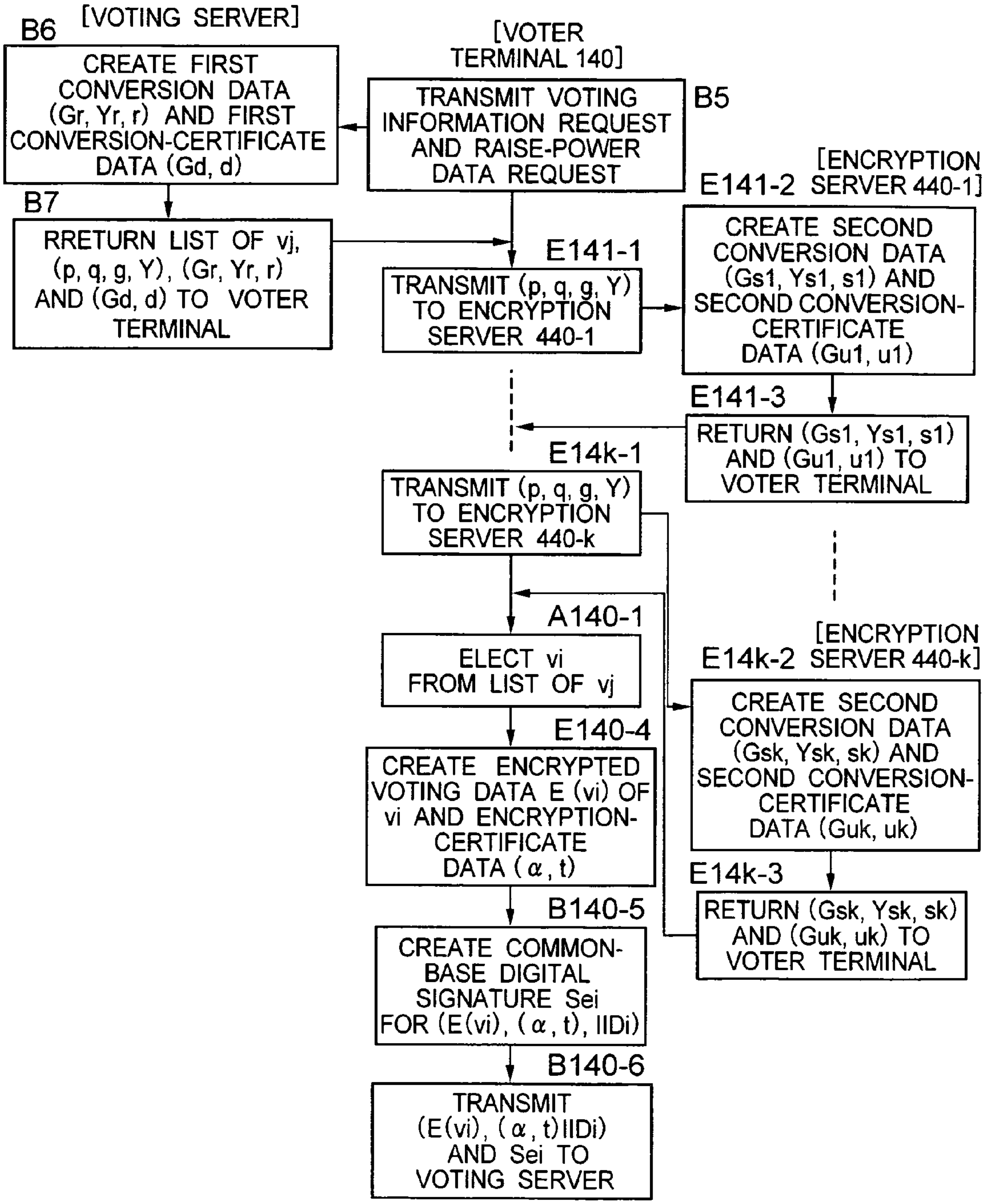
FIG. 27 is a flowchart showing operation of the voter terminal 140 in the fifth embodiment.
Figure 28:
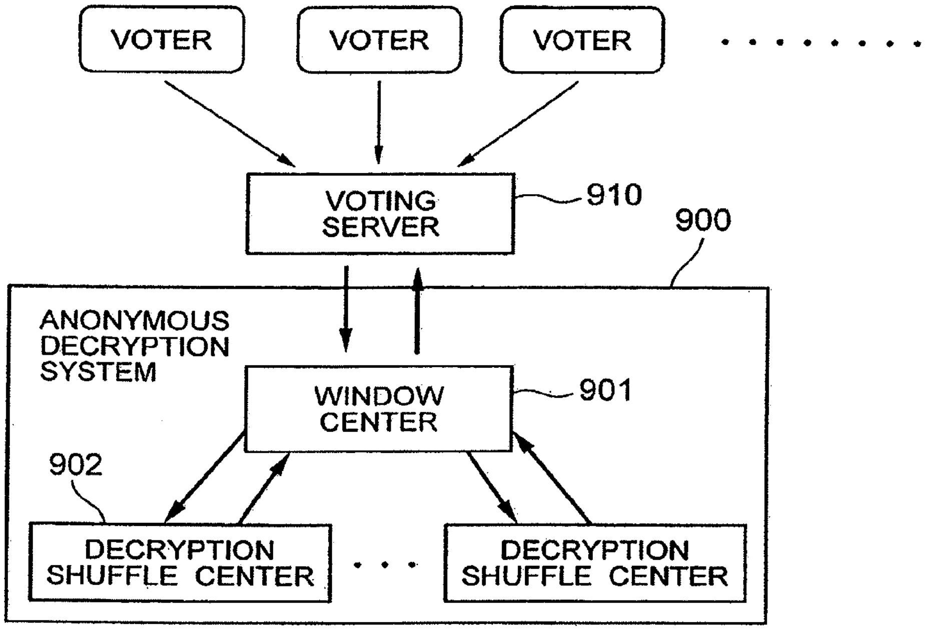
FIG.28 PRIOR ART
FIG. 28 is a block diagram of the configuration of a conventional anonymous electronic voting system.

Next, operation of the anonymous electronic voting system of the present embodiment will be described. FIGS. 25 to 27 show processings by the voter terminals 100, 110, 140 (and processings by the voting server, authentication server and encryption server, relevant to the processings in the voter terminals). Operation of the voter terminals 120, 130, 150 is similar to that in the second embodiment, and thus is omitted for description.

Hereinafter, processings from access to the voting server 200 by the voter terminals 100, 110, 140 to transmission of the voting data will be described.

The voter terminals 100, 110, 140 transmit a conversion-data request to the voting server 200 (step B5 in FIGS. 25, 26, 27). The voting server 200, upon receiving the conversion data request, inputs the public information (p, q, g, Y) into the first conversion means 206, to create the first conversion data (Gr, Yr, r) and first conversion-certificate data (Gd, d) (step B6 in FIGS. 25, 26, 27), and returns (p, q, g, Y), (Gr, Yr, r) and (Gd, d) to the voter terminals 100, 110, 140 (step B7 in FIGS. 25, 26, 27). The voter terminals 100, 110, 140, upon receiving (p, q, g, Y), (Gr, Yr, r) and (Gd, d) from the voting server 200, transmit (p, q, g, Y) and a conversion-data request to the encryption servers 400-1, 410-1, 440-1, respectively, (steps E101-1, E111-1, E141-1 in FIGS. 25, 26, 27). The encryption servers 400-1, 410-1, 440-1, upon receiving the public information (p, q, g, Y) and conversion-data request, input (p, q, g, Y) into the second conversion means 405-1, 415-1, 445-1, respectively, to create the second conversion data (Gs1, Ys1, s1) and second conversion-certificate data (Gu1, u1) (steps E101-2, E 111-2, E141-2 in FIGS. 25, 26, 27), and return (Gs1, Ys1, s1) and (Gu1, u1) to the voter terminals 100, 110, 140 (steps E101-3, E111-3, E141-3 in FIGS. 25, 26, 27). The voter terminals 100, 110, 140 iterate the same processing for the second encryption servers 400-1, 410-1, 440-1, and then iterate the same processing for all the k encryption servers 400-1 to 400-*k*, 410-1 to 410-*k*, and 440-1 to 440-*k*, thereby obtaining k second conversion data (Gs1, Ys1, s1) to (Gsk, Ysk, sk) and k second conversion-certificate data (Gu1, u1) to (Guk, uk) (up to steps E10*k*-3, E11*k*-3, E14*k*-3 in FIGS. 25, 26, 27).

Subsequently, the voter terminals 100, 110, 140 input vi input by the voter, first conversion data (Gr, Yr, r), first conversion-certificate data (Gd, d), k second conversion data (Gs1, Ys1, s1) to (Gsk, Ysk, sk) and k second conversion-certificate data (Gu1, u1) to (Guk, uk) into the encrypted-data creation means 104, 114, 144, to calculate the encrypted voting data E(vi) and encryption-certificate data (., t) (steps E100-4, E110-4, E140-4 in FIGS. 25, 26, 27). Subsequent processings are similar to those in the second embodiment.

Next, advantages of the present embodiment will be described.

In the present embodiment, the voter terminals 100, 110, 140 connect to the encryption servers 400-1 to 400-*k*, encryption servers 410-1 to 410-*k*, and encryption servers 440-1 to 440-*k*, respectively, and create the encrypted data E(vi) based on the first conversion data received from the voting server 200 and k second conversion data received from k encryption servers, and transmit the encrypted data E(vi) to the voting server 200. Thus, unless all the voting server and k encryption server collude together, the plaintext voting contents are not detected from E'(vi), whereby the secrecy of the votes can be assured more strongly.

Although the number of the encryption servers connected to the voter terminals 100, 110, 140 each is k herein, the number need not be the same and may be different. In addition, some voter terminals may share some second encryption servers therebetween.

Another configuration wherein the voting sever is not provided with the first conversion means and the encrypted voting data E(vi) and encryption-certificate data (., t) may be created using only the second conversion data E(vi) and second encryption-certificate data received from the k encryption servers. In this case, all the voter terminals including the voter terminals 100, 110, 140 transmit only a voting-information request to the voting server 200, and the voting server 200 transmits the public information (p, q, g, Y) and candidate information to all the voter terminals. The encrypted-data creation means 104, 114, 144 of the voter terminal 100, 110, 140 calculate the encrypted voting data E(vi) and encryption-certificate data (., t) based on the k second conversion data (Gs1, Ys1, s1) to (Gsk, Ysk, sk) and k second conversion-certificate data (Gd1, d1) to (Gdk, dk) as follows:

$$E(vi) = (Gi, Vi)$$
$$= (Gs1 \times Gs2 \times \ldots \times Gsk \bmod p,$$
$$vi \times Ys1 \times Ys2 \times \ldots\ Ysk \bmod p);$$
$$= Gd1 \times Gd2 \times \ldots\ Gdk \bmod p;$$

$$c = HASH(p, q, g, Y, Gi, Vi,);$$

$$t = c \times (s1 + s2 + \ldots sk) + d1 + d2 \ldots dk \bmod q.$$

It is possible for the voting server to calculate beforehand the first conversion data and first conversion-certificate data, and similarly, and that the public information (p, q, g, Y) is distributed beforehand to the encryption server, to calculate beforehand the second conversion data and second conversion-certificate data in advance.

Although preferred embodiments of the present invention are described as above, each of the voter terminals, voting server, authentication server, encryption server and encryption-certificate verification server configuring the above anonymous electronic voting system can be implemented by installing a computer program for implementing the function thereof in a server computer or personal computer, and by executing the program. Such a computer program is generally read into a magnetic tape or CD-ROM, or a computer via a network. In other words, each of the constituent elements in the voter terminals, voting server, authentication server, encryption server, and encryption-certificate verification server can be implemented by software or hardware.

Especially for a computer implementing the voter terminal, a computer, such as a cellular phone or a variety of potable data assistants (PDA), having a relatively lower processing throughput and smaller storage capacity, can be used so long as the computer has a data processing capability and a network connection capability.

The present invention is applicable to the use of an anonymous electronic voting system via a the network etc. It is also applicable to the use of an anonymity electronic questionnaire system via a network etc. which allows free description as the contents of vote.

The invention claimed is:

1. An anonymous electronic voting system comprising:

voter terminals for receiving a list of combinations of candidate names and encrypted candidate names, to transmit an encrypted candidate name of a selected candidate via a network;

at least one encryption server for receiving and re-encrypting said encrypted candidate name of the selected candidate to create encrypted voting data, and returning said encrypted voting data to said voter terminal having transmitted said encrypted candidate name of the selected candidate;

a voting server for receiving said encrypted voting data from said voter terminal to create a list of effective encrypted voting data from among said received encrypted voting data, and transmitting said created list of said effective encrypted voting data via said network; and a decryption server for decrypting said list of said effective encrypted voting data received from said voting server, to create and transmit via said network a list of plaintext candidate names rearranged from said list of said effective encrypted voting data, wherein said voting server receives said list of said plaintext candidate names from said decryption server, to tally vote results based on said list of said received candidate names.

2. The anonymous electronic voting system according to claim 1, further comprising another voter terminal including an encryption means for encrypting a candidate name of a selected candidate to create an encrypted candidate name.

3. The anonymous electronic voting system according to claim 1, further comprising an authentication server, wherein:

said voter terminal includes an intra-organization-signature creation means for creating an intra-organization digital signature based on said encrypted voting data, intra-organization identification data, and a private key, said authentication server receives said encrypted voting data, said intra-organization identification data, and said intra-organization digital signature from said voter terminal, to certify said intra-organization digital signature based on a public key; and said voting server acknowledges at least said encrypted voting data affixed with certificate data by said authentication server as said effective encrypted voting data.

4. The anonymous electronic voting system according to 1 further comprising an authentication server including a storage device for storing a list of identification data of voters or voter terminals included in a voter list, said authentication server receiving said encrypted voting data and identification data from said voter terminal to certify said encrypted voting data based on said identification data stored in said storage device, wherein said voting server acknowledges at least said encrypted voting data affixed with certificate data by said authentication server as said effective encrypted voting data.

5. The anonymous electronic voting system according to any claim 1, wherein said at least one encryption server include a group of encryption servers for consecutively multiple-encrypting said encrypted candidate name, and said voting server receives said encrypted voting data multiple-encrypted by said group of said encryption servers.

6. The anonymous electronic voting system according to claim 1, wherein:

each of said combinations in said list includes, in addition to said candidate name and said encrypted candidate name, certificate data for certifying that said candidate name is legitimately encrypted; and said encryption server creates, in addition to said encrypted voting data, certificate data for certifying legitimacy of said encrypted voting data, to return the same to said voter terminal.

7. An anonymous electronic voting system comprising:

voter terminals connected to a network;

a first encryption server including a first data conversion means for creating a first encryption parameter for each of said voter terminals from public information, and transmitting said first parameter to said voter terminals;

a second encryption server including a second data conversion means for creating a second encryption parameter, and transmitting said second parameter to said voter terminals;

a voting server for receiving encrypted voting data from said voter terminals to create a list of effective encrypted voting data from among said received encrypted voting data, and transmitting said created list of said effective encrypted voting data via said network; and a decryption server for decrypting said list of said effective encrypted voting data received from said voting server, to create and transmit via said network a list of plaintext candidate names rearranged from said list of said effective encrypted voting data, wherein:

names from said decryption server, to tally voted results based on said list of said received candidate names; and said voter terminals each include an encryption means for encrypting voting contents based on said first and second encryption parameters to create encrypted voting data, and transmits said encrypted voting data to said voting server.

8. The anonymous electronic voting system according to claim 7, wherein said first encryption server and said voting server operate on a common server.

9. The anonymous electronic voting system according to claim 7, wherein:

said voter terminals create, in addition to said encrypted voting data, encryption-certificate data, and transmits the same to said voting server;

said voting server, upon completing verification of legitimacy by verifying at least said encryption-certificate data, acknowledges corresponding said encrypted voting data as said effective encrypted voting data.

10. The anonymous electronic voting system according to claim 7, further comprising an authentication server including a storage device for storing a list of identification data of voters or voter terminals included in a voter list, said authentication server receiving said encrypted voting data and identification data from said voter terminals to certify said encrypted voting data based on said identification data stored in said storage device, wherein said voting server acknowledges at least said encrypted voting data affixed with certificate data by said authentication server as said effective encrypted voting data.

11. The anonymous electronic voting system according to claim 7, further comprising an authentication server, wherein:

said voter terminals each include an intra-organization-signature creation means for creating an intra-organization digital signature based on said encrypted voting data, intra-organization identification data, and a private key, said authentication server receives said encrypted voting data, said intra-organization identification data, and said intra-organization digital signature from said voter terminal, to certify said intra-organization digital signature based on a public key; and said voting server acknowledges at least said encrypted voting data affixed with certificate data by said authentication server as said effective encrypted voting data.

12. An anonymous electronic voting method using a voting server, a voter terminal for voting therethrough by a voter, an encryption server, and a decryption server, said comprising the steps of:

transmitting from said voting server a list of combinations of candidate names and encrypted candidate names obtained by encrypting said candidate names to said voter terminal via a network;

transmitting from said voter terminal an encrypted candidate name, which is paired with a candidate name selected by a voter, to said encryption server;

re-encrypting said encrypted candidate name in said encryption server to create encrypted voting data, and transmitting said encrypted voting data to said voter terminal having transmitted said encrypted candidate name;

transmitting from said voter terminal said encrypted voting data, which is received from said encryption server, to said voting server;

receiving said encrypted voting data in said voting server to create and transmit a list of effective encrypted voting data;

decrypting said list of said encrypted voting data in said decryption server to create a list of plaintext candidate names rearranged; and receiving said list of said plaintext candidate names in said voting server to tally vote results based on said list of said received candidate names.

13. The anonymous electronic voting method according to claim 12, further comprising the steps of:

receiving from said voter terminal said encrypted voting data and identification data in an authentication server to certify said encrypted voting data based on identification data stored in a storage device and transmitting said encrypted voting data; and acknowledging in said voting server at least said encrypted voting data affixed with certificate data by said authentication server as said effective encrypted voting data.

14. The anonymous electronic voting method according to claim 12, further comprising the steps of:

creating in said voter terminal an intra-organization digital signature based on said encrypted voting data, intra-organization identification data, and a private key;

receiving in said authentication server said encryption voting data, intra-organization identification server and intra-organization digital signature from said voter terminal;

acknowledging in said voting server at least said encrypted voting data affixed with certificate data by said authentication server as said effective encrypted voting data.

15. The anonymous electronic voting method according to claim 12, wherein said step of re-encrypting said encrypted candidate name is the step of consecutively multiple-encrypting said encrypted candidate name in a group of encryption servers.

16. The anonymous electronic voting method according to claim 12, wherein:

each of said combinations in said list includes, in addition to said candidate name and said encrypted candidate name, certificate data for certifying that said candidate name is legitimately encrypted; and said encryption server creates, in addition to said encrypted voting data, certificate data for certifying legitimacy of said encrypted voting data, to return the same to said voter terminal.

17. An anonymous electronic voting method comprising the steps of:

creating in a first encryption server a first encryption parameter for each of voter terminals from public information, and transmitting said first parameter to said voter terminals;

creating in a second encryption server a second encryption parameter for each of said voter terminals from said public information, and transmitting said second parameter to said voter terminals;

encrypting voting contents of a voter in said voter terminal based on said first and second encryption parameters to create encrypted voting data, and transmitting said encrypted voting data to said voting server;

creating a list of effective encrypted voting data from among said received encrypted voting data in said voting server and transmitting said created list of said effective encrypted voting data via said network;

decrypting in a decryption server said list of said effective encrypted voting data received from said voting server, to create and transmit via said network a list of plaintext candidate names rearranged from said list of said effective encrypted voting data; and receiving in said voting server said plaintext candidate names, to tally voted results based on said list of said received candidate names.

18. The anonymous electronic voting method according to claim 17, wherein said encryption voting data creating step creates encryption-certificate data certifying legitimacy of said encrypted voting data, further comprising the step:

after verifying legitimacy in said voting server by verifying at least said encryption-certificate data, acknowledging corresponding said encrypted voting data as said effective encrypted voting data.

19. The anonymous electronic voting method according to claim 17, further comprising the steps of: receiving in a certification server said encrypted voting data and identification data from said voter terminal, and certifying said encrypted voting data based on identification data stored in a storage device; and acknowledging in said voting server at least said encrypted voting data affixed with said certificate data as said effective voting data.

20. The anonymous electronic voting method according to claim 17, further comprising the steps of:

creating in said voter terminal an intra-organization digital signature based on said encrypted voting data, intra-organization identification data, and a private key;

receiving in said authentication server said encrypted voting data, said intra-organization identification data, and said intra-organization digital signature from said voter terminal, to certify said intra-organization digital signature based on a public key; and acknowledging in said voting server at least said encrypted voting data affixed with certificate data by said authentication server as said effective encrypted voting data.

21. The anonymous electronic voting method according to claim 7, wherein said at least one second encryption server include a group of second encryption servers, and said voter terminals each include an encryption means for multiple-encrypting said voting contents based on said first parameter and said second parameters transmitted from said group of second encryption servers to create said encrypted voting data and transmit said encrypted voting data to said voting server.

22. The anonymous voting method according to claim 17, wherein said creating of said second parameter includes creating a plurality of said second parameter in a group of second encryption servers, and said encrypting of said voting contents includes multiple-encrypting said voting contents based on said first parameter and a plurality of said second parameters.

* * * * *